US 11,178,673 B2

(12) United States Patent
Loehr et al.

(10) Patent No.: US 11,178,673 B2
(45) Date of Patent: *Nov. 16, 2021

(54) THRESHOLD-BASED AND POWER-EFFICIENT SCHEDULING REQUEST PROCEDURE

(71) Applicant: Apple Inc., Cupertino, CA (US)

(72) Inventors: Joachim Loehr, Hessen (DE); Takahisa Aoyama, Osaka (JP); Prateek Basu-Mallick, Hessen (DE); Takashi Tamura, Osaka (JP); Martin Feuersaenger, Bremen (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,906

(22) Filed: May 18, 2020

(65) Prior Publication Data

US 2020/0281000 A1    Sep. 3, 2020

Related U.S. Application Data

(63) Continuation of application No. 16/199,838, filed on Nov. 26, 2018, now Pat. No. 10,701,708, which is a (Continued)

(30) Foreign Application Priority Data

May 4, 2012  (EP) ..................... 12166900

(51) Int. Cl.
*H04W 72/10*     (2009.01)
*H04W 72/12*     (2009.01)
(Continued)

(52) U.S. Cl.
CPC ....... *H04W 72/10* (2013.01); *H04W 72/1242* (2013.01); *H04W 72/1268* (2013.01);
(Continued)

(58) Field of Classification Search
CPC ............. H04W 72/10; H04W 72/1284; H04W 72/1242; H04W 72/1247; H04W 72/1268;
(Continued)

(56) References Cited

U.S. PATENT DOCUMENTS 2,237,633 A    4/1941  Riker
8,437,293 B2   5/2013  Jersenius et al.
(Continued)

FOREIGN PATENT DOCUMENTS

EP    2 237 633 A1    10/2010
JP    2010-114681 A    5/2010
(Continued)

OTHER PUBLICATIONS

3GPP TR 25.912 V10.0.0, "$3^{rd}$ Generation Partnership Project; Technical Specification Group Radio Access Network; Feasibility study for evolved Universal Terrestrial Radio Access (UTRA) and Universal Terrestrial Radio Access Network (UTRAN) (Release 10)," Mar. 2011, 64 pages.
(Continued)

*Primary Examiner* — Phong La
(74) *Attorney, Agent, or Firm* — Kilpatrick Townsend & Stockton LLP

(57) ABSTRACT

The invention relates to methods for improving a scheduling request transmission between a UE and a base station. The transmission of the scheduling request is postponed, by implementing a threshold that the data in the transmission buffer has to reach, before a transmission of the scheduling request is triggered. In one variant, the data in the transmission buffer needs to reach a specific amount, to trigger a scheduling request. The invention refers to further improvements: the PDDCH monitoring time window is delayed after sending a scheduling request; the dedicated scheduling request resources of the PUCCH are prioritized differently such that low-priority scheduling requests are transmitted less often.

20 Claims, 12 Drawing Sheets

Related U.S. Application Data continuation of application No. 15/630,410, filed on Jun. 22, 2017, now Pat. No. 10,178,682, which is a continuation of application No. 14/394,066, filed as application No. PCT/EP2013/052339 on Feb. 6, 2013, now Pat. No. 9,723,618.

(51) Int. Cl.

| | | |
|---|---|---|
| H04W 76/28 | (2018.01) | |
| H04L 1/00 | (2006.01) | |
| H04L 1/06 | (2006.01) | |
| H04L 1/18 | (2006.01) | |
| H04W 88/02 | (2009.01) | |

(52) U.S. Cl.
CPC ............ *H04W 72/1284* (2013.01); *H04W 72/1289* (2013.01); *H04L 1/0003* (2013.01); *H04L 1/0009* (2013.01); *H04L 1/0026* (2013.01); *H04L 1/06* (2013.01); *H04L 1/1819* (2013.01); *H04L 1/1822* (2013.01); *H04W 72/1252* (2013.01); *H04W 76/28* (2018.02); *H04W 88/02* (2013.01); *Y02D 30/70* (2020.08)

(58) Field of Classification Search
CPC ......... H04W 72/1269; H04W 72/1289; H04W 72/1252; H04W 76/28; H04W 76/38; H04W 88/02; H04L 1/0003; H04L 1/0009; H04L 1/0026; H04L 1/0027; H04L 1/06; H04L 1/02; H04L 1/1819; H04L 1/1822
USPC ......................................................... 370/329
See application file for complete search history.

(56) References Cited

U.S. PATENT DOCUMENTS

| | | | |
|---|---|---|---|
| 8,873,475 B2 | 10/2014 | Ono | |
| 9,301,311 B2 | 3/2016 | Jersenius et al. | |
| 9,723,618 B2 | 8/2017 | Loehr et al. | |
| 10,178,682 B2 | 1/2019 | Loehr et al. | |
| 2004/0004954 A1 | 1/2004 | Terry et al. | |
| 2005/0030894 A1 | 2/2005 | Stephens | |
| 2005/0047416 A1 | 3/2005 | Heo et al. | |
| 2005/0135416 A1 | 6/2005 | Ketchum et al. | |
| 2005/0213534 A1 | 9/2005 | Benveniste | |
| 2005/0249138 A1 | 11/2005 | Heo et al. | |
| 2005/0249497 A1 | 11/2005 | Haran et al. | |
| 2006/0041667 A1 | 2/2006 | Ahn et al. | |
| 2006/0077947 A1 | 4/2006 | Kim et al. | |
| 2006/0092876 A1 | 5/2006 | Kwak et al. | |
| 2006/0156164 A1 | 7/2006 | Meyer et al. | |
| 2006/0159098 A1 | 7/2006 | Munson et al. | |
| 2006/0190610 A1 | 8/2006 | Motegi et al. | |
| 2006/0282739 A1 | 12/2006 | Meyer et al. | |
| 2006/0285515 A1 | 12/2006 | Julian et al. | |
| 2007/0091810 A1 | 4/2007 | Kim et al. | |
| 2007/0115894 A1 | 5/2007 | Herrmann et al. | |
| 2007/0121542 A1* | 5/2007 | Lohr ...................... H04L 47/24 370/329 |
| 2007/0135130 A1 | 6/2007 | Lee | |
| 2007/0201397 A1 | 8/2007 | Zhang | |
| 2008/0081628 A1 | 4/2008 | Ye et al. | |
| 2008/0304447 A1 | 12/2008 | Kim et al. | |
| 2009/0116939 A1 | 5/2009 | Weber et al. | |
| 2009/0280798 A1 | 11/2009 | Meylan et al. | |
| 2010/0040028 A1 | 2/2010 | Maheshwari et al. | |
| 2010/0098011 A1 | 4/2010 | Pelletier et al. | |
| 2010/0135233 A1 | 6/2010 | Ono | |
| 2010/0202380 A1 | 8/2010 | Park et al. | |
| 2010/0202420 A1* | 8/2010 | Jersenius ................ H04J 11/00 370/337 |
| 2010/0254340 A1 | 10/2010 | Park et al. | |
| 2010/0284354 A1 | 11/2010 | Ostergaard et al. | |
| 2010/0296449 A1* | 11/2010 | Ishii ...................... H04L 47/34 370/328 |
| 2010/0322098 A1 | 12/2010 | Pelletier et al. | |
| 2011/0092201 A1 | 4/2011 | Lindström et al. | |
| 2011/0143801 A1 | 6/2011 | Bucknell et al. | |
| 2012/0033597 A1 | 2/2012 | Kim et al. | |
| 2012/0039263 A1 | 2/2012 | Moberg et al. | |
| 2012/0069805 A1 | 3/2012 | Feuersanger et al. | |
| 2012/0079132 A1 | 3/2012 | Liu et al. | |
| 2012/0093106 A1 | 4/2012 | Dong | |
| 2012/0106389 A1 | 5/2012 | Baker et al. | |
| 2012/0294269 A1 | 11/2012 | Yamada et al. | |
| 2013/0010738 A1 | 1/2013 | Marchand et al. | |
| 2013/0235768 A1 | 9/2013 | Earnshaw et al. | |
| 2013/0250882 A1 | 9/2013 | Dinan | |
| 2013/0343293 A1 | 12/2013 | Jersenius et al. | |
| 2014/0161086 A1 | 6/2014 | Tamura et al. | |
| 2015/0071224 A1 | 3/2015 | Baker et al. | |

FOREIGN PATENT DOCUMENTS

| | | |
|---|---|---|
| JP | 2010-530707 A | 9/2010 |
| JP | 2011-509535 A | 3/2011 |
| JP | 2011518468 | 6/2011 |
| JP | 2012-500534 A | 1/2012 |
| JP | 2012-532480 A | 12/2012 |
| JP | 2018083214 | 5/2018 |
| WO | 2008/024289 A2 | 2/2008 |
| WO | 2009/116939 A2 | 9/2009 |
| WO | 2011/001330 A1 | 1/2011 |

OTHER PUBLICATIONS

3GPP TS 22.368 V11.4.0, "3$^{rd}$ Generation Partnership Project; Technical Specification Group Services and System Aspects; Service requirements for Machine-Type Communications (MTC); Stage 1 (Release 11)," Mar. 2012, 25 pages.
3GPP TS 36.211 V8.0.0, "3$^{rd}$ Generation Partnership Project; Technical Specification Group Radio Access Network; Evolved Universal Terrestrial Radio Access (U-UTRA); Physical channels and modulation (Release 8)," Technical Specification, Sep. 2007, 50 pages.
3GPP TS 36.212 V8.0.0, "3$^{rd}$ Generation Partnership Project; Technical Specification Group Radio Access Network; Evolved Universal Terrestrial Radio Access (E-UTRA); Multiplexing and channel coding (Release 8)," Section 5.3.3.1, Sep. 2007, 2 pages.
3GPP TS 36.321 V10.5.0, "3$^{rd}$ Generation Partnership Project; Technical Specification Group Radio Access Network; Evolved Universal Terrestrial Radio Access (E-UTRA); Medium Access Control (MAC) protocol specification (Release 10)," Technical Specification, Mar. 2012, 54 pages.
Chairman, "Draft User Plan session report," R2-081220, 3GPP TSG RAN WG2 #61, Sorrento, Italy, Feb. 11-15, 2008, 26 pages.
Chairman, "Minutes of RAN2#61bis LTE UP," R2-082026, 3GPP TSG RAN WG2 #61bis, Shenzhen, China, Mar. 31-Apr. 4, 2008, 31 pages.
English Translation of Notice of Reasons for Rejection, dated Jun. 7, 2016, for corresponding JP Application No. 2015-509336, 7 pages.
English Translation of International Search Report dated Mar. 12, 2013, for corresponding International Application No. PCT/EP2013/052339, 2 pages.
Ericsson, "Timer based solution for continuous trigger for BSR," Tdoc R2-080085, 3GPP TSG-RAN WG2 #60bis, Agenda Item 5.1.1.5, Sevilla, Jan. 14-18, 2008, 3 pages.
Ericsson, "Triggering of SR in relation to allocated uplink grants," Tdoc R2-081016, 3GPP TSG-RAN WG2 #61, Sorrento, Italy, Feb. 11-15, 2008, 2 pages.
Ericsson, "SR triggering in relation to uplink grants," Tdoc R2-081468, 3GPP TSG-RAN WG2 #61bis, Agenda Item: 5.1.1.5, Shenzhen, China, Mar. 31-Apr. 4, 2008, 3 pages.
Ericsson, ST-Ericsson, "SR Prohibit Timer," R2-095795, 3GPP TSG-RAN WG2 #67bis, Agenda Item: 6.7.3, Miyazaki, Japan, Oct. 12-16, 2009, 9 pages.

(56) References Cited

OTHER PUBLICATIONS

Ericsson, ST-Ericsson, Nokia Siemens Networks, Nokia Corporation, "Introduction of SR prohibit timer," R2-097458, 3GPP TSG-RAN2 Meeting #68, Jeju, South Korea, Nov. 9-13, 2009, 7 pages.
ETSI TS 136 211 V8.6.0, "LTE; Evolved Universal Terrestrial Radio Access (E-UTRA); Physical channels and modulation (3GPP TS 36.211 version 8.6.0 Release 8)," Section 6.2, Apr. 2009, 6 pages.
ETSI TS 136 321 V10.4.0, "LTE; Evolved Universal Terrestrial Radio Access (E-UTRA); Medium Access Control (MAC) protocol specification (3GPP TS 36.321 version 10.4.0 Release 10)," Jan. 2012, 56 pages.
ETSI TS 136 321 V10.5.0, "LTE; Evolved Universal Terrestrial Radio Access (E-UTRA); Medium Access Control (MAC) protocol specification (3GPP TS 36.321 version 10.5.0 Release 10)," Sections 5.4.5 and 6.1.3.1, Mar. 2012, 4 pages.
Extended European Search Report, dated Apr. 28, 2016, for corresponding EP Application No. 16151516.8-1870, 11 pages.
Extended European Search Report dated Sep. 3, 2014, for corresponding EP Application No. 12166900.6-2412, 6 pages.
HTC Corporation, "BSR Triggering with Semi-Persistent Scheduling," R2-085201, 3GPP TSG-RAN WG2 #63bis, Agenda item: 6.1.1.8, Prague, Czech, Sep. 29-Oct. 3, 2008, 7 pages.
Huawei, HiSilicon, "L2 Signalling Associated with Data Transmission," R2-121612, Jeju, Korea, Mar. 26-30, 2012, 3 pages.
Larmo et al. "The LTE Link-Layer Design," LTE Part II: 3GPP Release 8, IEEE Communications Magazine, Apr. 2009, 8 pages.
Motorola, "Threshold based BSR Triggering," Tdoc R2-081126, 3GPP TSG-RAN WG2#61, Agenda Item: 5.1.1.9, Sorrento, Italy, Feb. 11-15, 2008, 1 page.
Notification of Reasons for Rejection, dated Feb. 5, 2019, corresponding to Japanese Application No. 2018-083214, 5 pages.
Philips, "Triggering of Scheduling Request," Tdoc R2-081767, 3GPP TSG-RAN WG2#61bis, Agenda Item: 5.1.1.5, Shenzhen, China, Mar. 31-Apr. 4, 2008, 3 pages.
Philips, "Triggering of Scheduling Request," Tdoc R2-082453, 3GPP TSG-RAN WG2#62, Agenda Item: 5.1.1.5, Kansas City, USA, May 5-9, 2008, 3 pages.
Qualcomm Europe, "BSR Triggers," R2-080375, 3GPP TSG-RAN WG2 #60bis, Agenda item: 5.1.1.5, Sevilla, Spain, Jan. 14-18, 2007, 3 pages.
Sesia et al., "LTE—The UMTS Long Term Evolution: From Theory to Practice," John Wiley & Sons, Ltd., ISBN: 978-0-470-69716-0, 2009, Chapter 9.3, 49 pages.
ETSI TS 136 321 V10.4.0, LTE, Evolved Universal Terrestrial Radio Access (E-UTRA), "Medium Access Control (MAC) protocol specification," Jan. 2012, 56 pages.
3GPP TS 36.321 version 10.5.0, LTE, ETSI TS 136 321 V10.5.0, Evolved Universal Terrestrial Radio Access (E-UTRA), "Medium Access Control (MAC) protocol specification," (Release 10) Mar. 2012, 8 pages.
3GPP TSG-RAN WG2 #59, "Text Proposal on Scheduling Request Triggering Criterions for LTE," Ericsson, Tdoc R2-073210, Aug. 20-24, 2007, 2 pages.
U.S. Appl. No. 14/394,066, Final Office Action, dated Jul. 25, 2016, 16 pages.
U.S. Appl. No. 14/394,066, Non-Final Office Action, dated Mar. 9, 2016, 37 pages.
U.S. Appl. No. 14/394,066, Notice of Allowance, dated Mar. 28, 2017, 14 pages.
U.S. Appl. No. 15/630,410, Non-Final Office Action, dated Mar. 7, 2018, 19 pages.
U.S. Appl. No. 15/630,410, Notice of Allowance, dated Aug. 27, 2018, 8 pages.
U.S. Appl. No. 16/199,838, Notice of Allowance, dated Feb. 19, 2020, 12 pages.
European Patent Application No. 18173320.5, Extended European Search Report, dated Jun. 19, 2018, 6 pages.
European Patent Application No. 19190349.1, Extended European Search Report, dated Sep. 9, 2019, 6 pages.
European Patent Application No. 20185013.8, Extended European Search Report, dated Jul. 24, 2020, 6 pages.
Japan Patent Application No. 2015-509336, Notice of Reasons for Rejection, dated Jun. 7, 2016, 4 pages.
Japan Patent Application No. 2015-509336, Notice of Decision to Grant, dated Jan. 31, 2017, 5 pages.
Japan Patent Application No. 2017-037447, Notice of Decision to Grant, dated Mar. 27, 2018, 5 pages.
Japan Patent Application No. 2018-083214, Notice of Decision to Grant, dated May 28, 2019, 5 pages.
Japan Patent Application No. 2019-118963, Notice of Decision to Grant, dated Apr. 7, 2020, 5 pages.
Japan Patent Application No. 2020-079668, Office Action, dated Apr. 6, 2021, 4 pages.
International Patent Application No. PCT/EP2013/052339, International Preliminary Report on Patentability, dated Nov. 13, 2014, 8 pages.

* cited by examiner

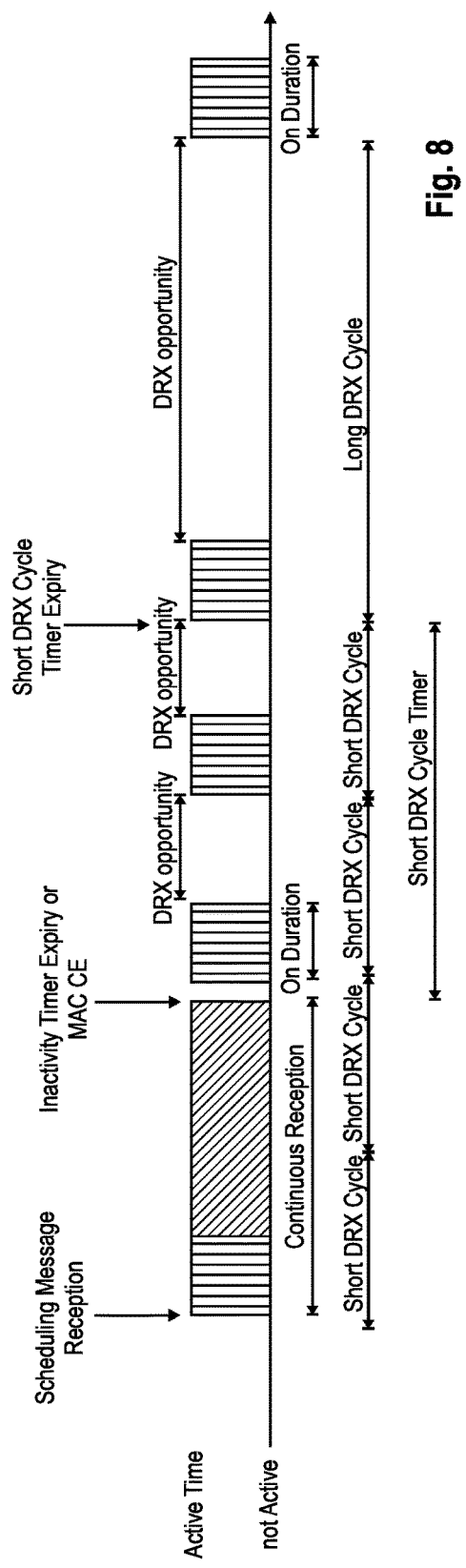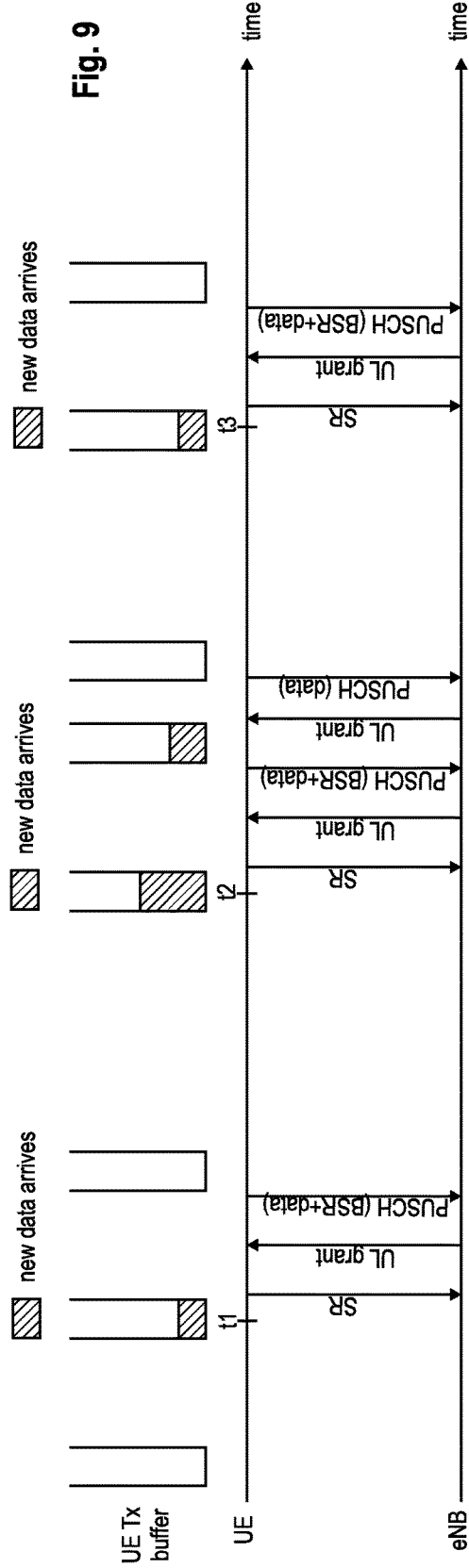

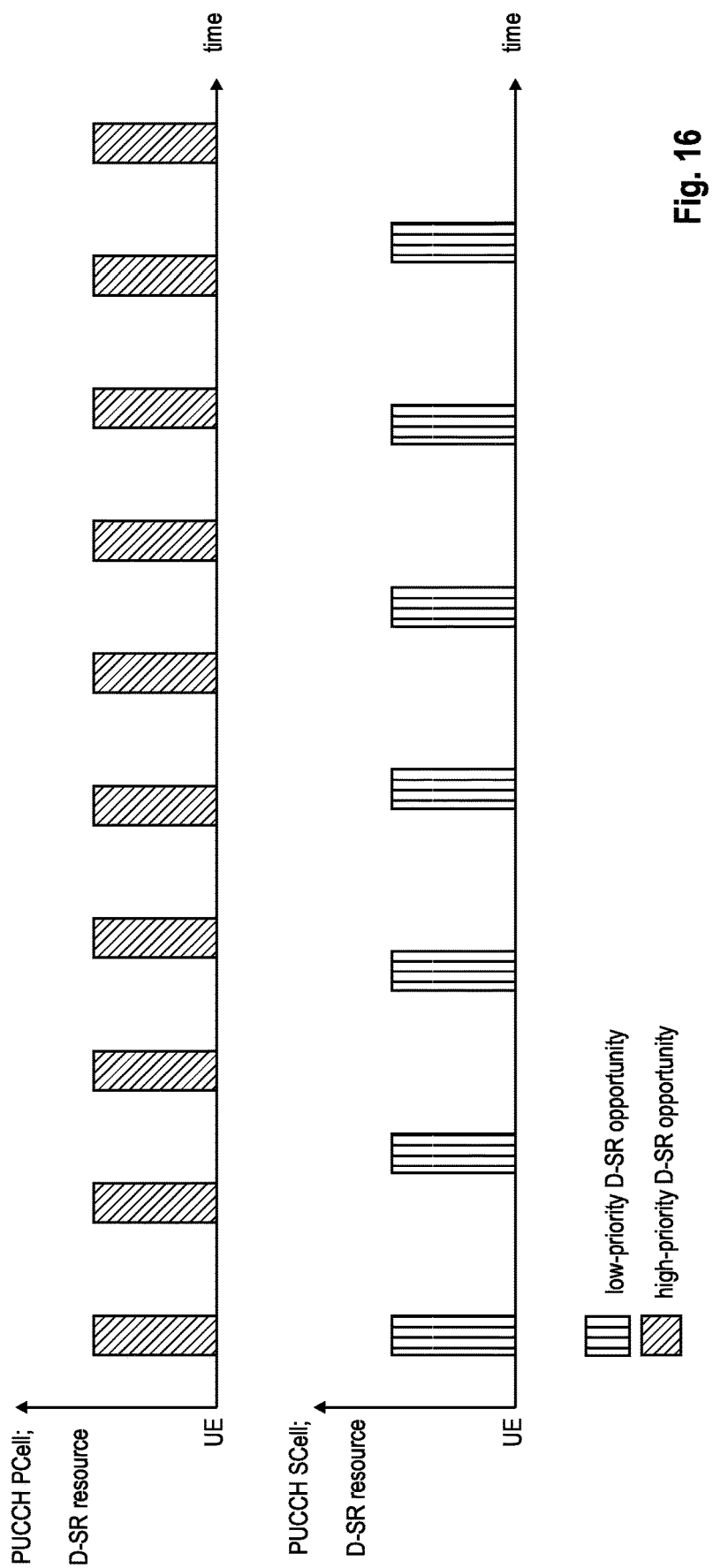

THRESHOLD-BASED AND POWER-EFFICIENT SCHEDULING REQUEST PROCEDURE

FIELD OF THE INVENTION

The invention relates to methods for improvements to the scheduling request procedure performed between a user equipment and a radio base station. The invention is also providing the user equipment for performing the methods described herein.

TECHNICAL BACKGROUND

Long Term Evolution (LTE) Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called subframes. In 3GPP LTE (Release 8) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ A subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{RB}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced. Two major technology components are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g., barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively. The transport channels are described between MAC and Layer 1, the logical channels are described between MAC and RLC.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment; the component carrier corresponding to that cell is referred to as the downlink Primary Cell (PCell). There is always one and only one downlink PCell (DL PCell) and one uplink PCell (UL PCell) configured per user equipment in connected state. In the downlink, the carrier corresponding to the PCell is the Downlink Primary Component Carrier (DL PCC), while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC), while in the uplink it is an Uplink Secondary Component Carrier (UL SCC).

The characteristics of the downlink and uplink PCell are:
For each SCell the usage of uplink resources by the UE in addition to the downlink ones is configurable (the number of DL SCCs configured is therefore always larger or equal to the number of UL SCCs, and no SCell can be configured for usage of uplink resources only)

The downlink PCell cannot be de-activated, unlike SCells

Re-establishment is triggered when the downlink PCell experiences Rayleigh fading (RLF), not when downlink SCells experience RLF Non-access stratum information is taken from the downlink PCell PCell can only be changed with handover procedure (i.e., with security key change and RACH procedure)

PCell is used for transmission of PUCCH

The uplink PCell is used for transmission of Layer 1 uplink control information

From a UE viewpoint, each uplink resource only belongs to one serving cell

The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). In other words, while in connected mode, UEs need not acquire broadcast system information directly from the SCells.

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE RRC States

LTE is based on only two main states: "RRC_IDLE" and "RRC_CONNECTED".

In RRC_IDLE the radio is not active, but an ID is assigned and tracked by the network. More specifically, a mobile terminal in RRC_IDLE performs cell selection and reselection—in other words, it decides on which cell to camp. The cell (re)selection process takes into account the priority of each applicable frequency of each applicable Radio Access Technology (RAT), the radio link quality and the cell status (i.e., whether a cell is barred or reserved). An RRC_IDLE mobile terminal monitors a paging channel to detect incoming calls, and also acquires system information. The system information mainly consists of parameters by which the network (E-UTRAN) can control the cell (re) selection process. RRC specifies the control signaling applicable for a mobile terminal in RRC_IDLE, namely paging and system information. The mobile terminal behavior in RRC_IDLE is specified in TR 25.912, e.g., Chapter 8.4.2 incorporate herein by reference.

In RRC_CONNECTED the mobile terminal has an active radio operation with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighboring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behavior in RRC_CONNECTED.

FIG. 7 shows a state diagram with an overview of the relevant functions performed by the mobile terminal in IDLE and CONNECTED state.

Logical and Transport Channels

The MAC layer provides a data transfer service for the RLC layer through logical channels. Logical channels are either Control Logical Channels which carry control data such as RRC signaling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling needs only be transmitted once per TTI.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information.

Shared Control Information (SCI) Carrying Cat 1 Information

The shared control information part of the L1/L2 control signaling contains information related to the resource allocation (indication). The shared control information typically contains the following information:
  A user identity indicating the user(s) that is/are allocated the resources.
  RB allocation information for indicating the resources (Resource Blocks (RBs)) on which a user(s) is/are allocated. The number of allocated resource blocks can be dynamic.
  The duration of assignment (optional), if an assignment over multiple sub-frames (or TTIs) is possible.

Depending on the setup of other channels and the setup of the Downlink Control Information (DCI)—see below—the shared control information may additionally contain information such as ACK/NACK for uplink transmission, uplink scheduling information, information on the DCI (resource, MCS, etc.).

Downlink Control Information (DCI) Carrying Cat 2/3 Information

The downlink control information part of the L1/L2 control signaling contains information related to the transmission format (Cat 2 information) of the data transmitted to a scheduled user indicated by the Cat 1 information. Moreover, in case of using (Hybrid) ARQ as a retransmission protocol, the Cat 2 information carries HARQ (Cat 3) information. The downlink control information needs only to be decoded by the user scheduled according to Cat 1. The downlink control information typically contains information on:
  Cat 2 information: Modulation scheme, transport-block (payload) size or coding rate, MIMO (Multiple Input Multiple Output)-related information, etc. Either the transport-block (or payload size) or the code rate can be signaled. In any case these parameters can be calculated from each other by using the modulation scheme information and the resource information (number of allocated resource blocks)
  Cat 3 information: HARQ related information, e.g., hybrid ARQ process number, redundancy version, retransmission sequence number Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference).

Format 0: DCI Format 0 is used for the transmission of resource grants for the PUSCH.

For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference.

Downlink & Uplink Data Transmission

Regarding downlink data transmission, L1/L2 control signaling is transmitted on a separate physical channel (PDCCH), along with the downlink packet data transmission. This L1/L2 control signaling typically contains information on:
  The physical resource(s) on which the data is transmitted (e.g., subcarriers or subcarrier blocks in case of OFDM, codes in case of CDMA). This information allows the mobile terminal (receiver) to identify the resources on which the data is transmitted.
  When user equipment is configured to have a Carrier Indication Field (CIF) in the L1/L2 control signaling, this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e., the cross-scheduled component carrier does not carry any L1/L2 control signaling.
  The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.
  Hybrid ARQ (HARQ) information:
    HARQ process number: Allows the user equipment to identify the hybrid ARQ process on which the data is mapped.
    Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
    Redundancy and/or constellation version: Tells the user equipment, which hybrid ARQ redundancy version is used (required for de-rate-matching) and/or which modulation constellation version is used (required for demodulation).
  UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on: The physical resource(s) on which the user equipment should transmit the data (e.g., subcarriers or subcarrier blocks in case of OFDM, codes in case of CDMA).

When user equipment is configured to have a Carrier Indication Field (CIF) in the L1/L2 control signaling, this information identifies the component carrier for which the specific control signaling information is intended. This enables assignments to be sent on one component carrier which are intended for another component carrier. This other, cross-scheduled component carrier may be for example a PDCCH-less component carrier, i.e., the cross-scheduled component carrier does not carry any L1/L2 control signaling.

L1/L2 control signaling for uplink grants is sent on the DL component carrier that is linked with the uplink component carrier or on one of the several DL component carriers, if several DL component carriers link to the same UL component carrier.

The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:
  HARQ Process number: Tells the user equipment from which hybrid ARQ process it should pick the data.
  Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
  Redundancy and/or constellation version: Tells the user equipment, which hybrid ARQ redundancy version to use (required for rate-matching) and/or which modulation constellation version to use (required for modulation).
  UE Identity (UE ID): Tells which user equipment should transmit data. In typical implementations this information is used to mask the CRC of the L1/L2 control signaling in order to prevent other user equipments to read this information.

There are several different possibilities how to exactly transmit the information pieces mentioned above in uplink and downlink data transmission. Moreover, in uplink and downlink, the L1/L2 control information may also contain additional information or may omit some of the information. For example:
  HARQ process number may not be needed, i.e., is not signaled, in case of a synchronous HARQ protocol.
  A redundancy and/or constellation version may not be needed, and thus not signaled, if Chase Combining is used (always the same redundancy and/or constellation version) or if the sequence of redundancy and/or constellation versions is pre-defined.
  Power control information may be additionally included in the control signaling.
  MIMO related control information, such as, e.g., pre-coding, may be additionally included in the control signaling.
  In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e., the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

DRX (Discontinuous Reception)

DRX functionality can be configured for RRC_IDLE, in which case the UE uses either the specific or default DRX value (defaultPagingCycle); the default is broadcasted in the System Information, and can have values of 32, 64, 128 and 256 radio frames. If both specific and default values are available, the shorter value of the two is chosen by the UE. The UE needs to wake up for one paging occasion per DRX cycle, the paging occasion being one subframe.

DRX functionality can be also configured for an "RRC_CONNECTED" UE, so that it does not always need to monitor the downlink channels. In order to provide reasonable battery consumption of user equipment, 3GPP LTE (Release 8/9) as well as 3GPP LTE-A (Release 10) provides a concept of discontinuous reception (DRX). Technical Standard TS 36.321 Chapter 5.7 explains the DRX and is incorporated by reference herein.

The following parameters are available to define the DRX UE behavior; i.e., the On-Duration periods at which the mobile node is active, and the periods where the mobile node is in a DRX mode.
  On duration: duration in downlink sub-frames that the user equipment, after waking up from DRX, receives and monitors the PDCCH. If the user equipment successfully decodes a PDCCH, the user equipment stays awake and starts the inactivity timer; [1-200 subframes; 16 steps: 1-6, 10-60, 80, 100, 200]
  DRX inactivity timer: duration in downlink sub-frames that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e., not for retransmissions). [1-2560 subframes; 22 steps, 10 spares: 1-6, 8, 10-60, 80, 100-300, 500, 750, 1280, 1920, 2560]
  DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]

DRX short cycle: specifies the periodic repetition of the on duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]

DRX short cycle timer: specifies the number of consecutive subframes the UE follows the short DRX cycle after the DRX Inactivity Timer has expired. This parameter is optional. [1-16 subframes]

Long DRX Cycle Start offset: specifies the periodic repetition of the on duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0–subframe length of chosen cycle]]

The total duration that the UE is awake is called "Active time". The Active Time includes the on-duration of the DRX cycle, the time UE is performing continuous reception while the inactivity timer has not expired and the time UE is performing continuous reception while waiting for a downlink retransmission after one HRQ RTT. Similarly, for the uplink the UE is awake at the subframes where uplink retransmission grants can be received, i.e., every 8 ms after initial uplink transmission until maximum number of retransmissions is reached. Based on the above, the minimum active time is of fixed length equal to on-duration, and the maximum is variable depending on, e.g., the PDCCH activity.

The operation of DRX gives the mobile terminal the opportunity to deactivate the radio circuits repeatedly (according to the currently active DRX cycle) in order to save power. Whether the UE indeed remains in DRX (i.e., is not active) during the DRX period may be decided by the UE; for example, the UE usually performs inter-frequency measurements which cannot be conducted during the On-Duration, and thus need to be performed some other time, during the DRX opportunity of time.

The parameterization of the DRX cycle involves a trade-off between battery saving and latency. For example, in case of a web browsing service, it is usually a waste of resources for a UE to continuously receive downlink channels while the user is reading a downloaded web page. On the one hand, a long DRX period is beneficial for lengthening the UE's battery life. On the other hand, a short DRX period is better for faster response when data transfer is resumed—for example when a user requests another web page.

To meet these conflicting requirements, two DRX cycles—a short cycle and a long cycle—can be configured for each UE; the short DRX cycle is optional, i.e., only the long DRX cycle is used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time the UE monitors PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to On Duration. Available DRX values are controlled by the network and start from non-DRX up to x seconds. Value x may be as long as the paging DRX used in RRC_IDLE. Measurement requirements and reporting criteria can differ according to the length of the DRX interval, i.e., long DRX intervals may have more relaxed requirements (for more details see further below). When DRX is configured, periodic CQI reports can only be sent by the UE during "active-time". RRC can further restrict periodic CQI reports so that they are only sent during the on-duration.

FIG. 8 discloses an example of DRX. The UE checks for scheduling messages (indicated by its C-RNTI, cell radio network temporary identity, on the PDCCH) during the "on duration" period, which is the same for the long DRX cycle and the short DRX cycle. When a scheduling message is received during an "on duration", the UE starts an "inactivity timer" and monitors the PDCCH in every subframe while the Inactivity Timer is running. During this period, the UE can be regarded as being in a continuous reception mode. Whenever a scheduling message is received while the Inactivity Timer is running, the UE restarts the Inactivity Timer, and when it expires the UE moves into a short DRX cycle and starts a "short DRX cycle timer". The short DRX cycle may also be initiated by means of a MAC Control Element. When the short DRX cycle timer expires, the UE moves into a long DRX cycle.

In addition to this DRX behavior, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

There is only one DRX cycle per user equipment. All aggregated component carriers follow this DRX pattern.

Machine to Machine

The current mobile networks are optimally designed for Human-to-Human communications, but are less optimal for M2M (Machine-2-Machine) applications, which according to 3GPP is also termed MTC (Machine-Type-Communication).

M2M Communication can be seen as a form of data communication between entities that do not necessarily need human interaction. It is different to current communication models as it involves new or different market scenarios, lower costs and effort, a potentially very large number of communicating terminals and little traffic per terminal to a large extent.

Some MTC applications are for example:

Security (e.g., Alarm Systems, Backup for landline, Access Control, Car/Driver security)

Tracking & Tracing (e.g., Fleet Management, Order Management, Pay as you drive, Road Tolling, Traffic information)

Payment (Point of Sales, Vending machines, Loyalty Concepts, Gaming machines)

Health (Monitoring vital signs, Remote diagnostics, Web Access Telemedicine point)

Remote Maintenance/Control (Sensors, Lighting, Pumps, Valves, Elevator control)

Metering (e.g., Power, Gas, Water, Heating, Grid Control)

A study item on M2M communications (3GPP TR 22.868) was completed in 2007. For Rel-10 and beyond, 3GPP intends to take the results on network improvements from the study item forward into a specification phase and address the architectural impacts and security aspects to support MTC scenarios and applications. As such, 3GPP has defined a work item on Network Improvements for Machine-Type Communication (NIMTC) with different goals and objectives such as to reduce the impact and effort of handling large machine-type communication groups, optimize network operations to minimize impact on device battery power usage, stimulate new machine-type communication applications by enabling operators to offer services tailored to machine-type communication requirements or provide network operators with lower operational costs when offering machine-type communication services.

The MTC has some specifics that are different from the usual human-to-human communication. 3GPP tries to identify these specifics in order to optimize the network operations. These specifics are called "MTC features" and are explained in the technical standard TS 22.368 available from http://www.3gpp.org and incorporated herein by reference. For example, one of the mentioned MTC feature can be "small data transmissions", meaning that the MTC device sends or receives small amounts of data. Small amount of data means that the data is smaller or comparable with the size of the exchanged signaling needed to establish the data connection.

Extra low-power consumption is also considered as a critical requirement for some types of MTC devices. For some devices, such as those used for gas metering and animal, cargo, prisoner, elderly and children tracking, low power consumption is critical because it is not easy to recharge or replace the battery. This creates the need for enhancements that would minimize the power consumption of MTC devices. Enhancements for optimizing battery consumption can be foreseen on the architecture level as well as on a lower layer protocol level such as PHY/MAC.

Moreover, LTE RAN enhancements for diverse data applications are under study in 3GPP. The machine type communication traffic profiles include sporadic data access for exchange of relatively small data amounts. Such a type of communication is particularly relevant for applications which require always-on connectivity, such as smart phones, sporadic access for the purpose of checking e-mails or social network updates. The aim of the working items is to identify and specify mechanisms at the radio access network level that enable enhancing the ability of the LTE to handle diverse traffic profiles. In particular, the aim is to reduce the power usage of the terminals in order to extend the battery life. The machine type communication traffic is in general delay insensitive, in which terminals and/or eNodeB can wait for some time until the data is delivered.

Uplink Access Scheme for LTE

For Uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g., a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

Uplink Scheduling Scheme for LTE

The uplink scheme allows for both scheduled access, i.e., controlled by eNB, and contention-based access.

In case of scheduled access, the UE is allocated a certain frequency resource for a certain time (i.e., a time/frequency resource) for uplink data transmission. However, some time/frequency resources can be allocated for contention-based access; within these time/frequency resources, UEs can transmit without first being scheduled. One scenario where UE is making a contention-based access is for example the random access, i.e., when UE is performing initial access to a cell or for requesting uplink resources.

For the scheduled access the Node B scheduler assigns a user a unique frequency/time resource for uplink data transmission. More specifically the scheduler determines which UE(s) that is (are) allowed to transmit, which physical channel resources (frequency), Transport format (Modulation Coding Scheme (MCS)) to be used by the mobile terminal for transmission The allocation information is signaled to the UE via a scheduling grant, sent on the L1/L2 control channel. For simplicity reasons this channel may be called uplink grant channel in the following. A scheduling grant message contains at least information which part of the frequency band the UE is allowed to use, the validity period of the grant and the transport format the UE has to use for the upcoming uplink transmission. The shortest validity period is one subframe. Additional information may also be included in the grant message, depending on the selected scheme. Only "per UE" grants are used to grant the right to transmit on the UL-SCH (i.e., there are no "per UE per RB" grants). Therefore, the UE needs to distribute the allocated resources among the radio bearers according to some rules. Unlike in HSUPA there is no UE-based transport format selection. The eNB decides the transport format based on some information, e.g., reported scheduling information and QoS info, and UE has to follow the selected transport format. In HSUPA the Node B assigns the maximum uplink resource, and the UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.

- Starvation of low priority services should be avoided
- Clear QoS differentiation for radio bearers/services should be supported by the scheduling scheme
- The UL reporting should allow fine granular buffer status reports (e.g., per radio bearer or per radio bearer group) in order to allow the eNB scheduler to identify for which Radio Bearer/service data is to be sent
- It should be possible to make clear QoS differentiation between services of different users
- It should be possible to provide a minimum bit rate per radio bearer As can be seen from the above list, one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Buffer Status/Scheduling Request Reporting

The usual mode of scheduling is dynamic scheduling, by means of downlink assignment messages for the allocation of downlink transmission resources and uplink grant messages for the allocation of uplink transmission resources; these are usually valid for specific single subframes. They are transmitted on the PDCCH using C-RNTI of the UE as already mentioned before. Dynamic scheduling is efficient for services types, in which the traffic is bursty and dynamic in rate, such as TCP.

In addition to the dynamic scheduling, a persistent scheduling is defined, which enables radio resources to be semi-statically configured and allocated to a UE for a longer time period than one subframe, thus avoiding the need for specific downlink assignment messages or uplink grant messages over the PDCCH for each subframe. Persistent scheduling is useful for services such as VoIP for which the data packets are small, periodic and semi-static in size. Thus, the overhead of the PDCCH is significantly reduced compared to the case of dynamic scheduling.

Buffer status reports (BSR) from the UE to the eNodeB are used to assist the eNodeB in allocating uplink resources, i.e., uplink scheduling. For the downlink case, the eNB scheduler is obviously aware of the amount of data to be delivered to each UE; however, for the uplink direction, since scheduling decisions are done at the eNB and the buffer for the data is in the UE, BSRs have to be sent from the UE to the eNB in order to indicate the amount of data that needs to be transmitted over the UL-SCH.

Buffer Status Report MAC control elements for LTE consist of either: a long BSR (with four buffer size fields corresponding to LCG IDs #0-3) or a short BSR (with one LCG ID field and one corresponding buffer size field). The buffer size field indicates the total amount of data available across all logical channels of a logical channel group, and is indicated in number of bytes encoded as an index of different buffer size levels (see also 3GPP TS 36.321 v 10.5.0 Chapter 6.1.3.1, incorporated herewith by reference).

Which one of either the short or the long BSR is transmitted by the UE depends on the available transmission resources in a transport block, on how many groups of logical channels have non-empty buffers and on whether a specific event is triggered at the UE. The long BSR reports the amount of data for four logical channel groups, whereas the short BSR indicates the amount of data buffered for only the highest logical channel group.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

In order to be robust against transmission failures, there is a BSR retransmission mechanism defined for LTE; the retransmission BSR timer is started or restarted whenever an uplink grant is restarted; if no uplink grant is received before the retransmission BSR timer expires, another BSR is triggered by the UE.

A BSR is triggered for events, such as:
- Whenever data arrives for a logical channel, which has a higher priority than the logical channels whose buffer are non-empty (i.e., whose buffer previously contained data);
- Whenever data becomes available for any logical channel, when there was previously no data available for transmission (i.e., all buffers previously empty)
- Whenever the retransmission BSR time expires
- Whenever periodic BSR reporting is due, i.e., periodicBSR timer expires
- Whenever there is a spare space in a transport block which can accommodate a BSR More detailed information with regard to BSR and in particular the triggering of same is explained in 3GPP TS 36.321 V10.5 in Chapter 5.4.5 incorporated herewith by reference.

If the UE has no uplink resources allocated for including a BSR in the transport block when a BSR is triggered, the UE sends a scheduling request (SR) to the eNodeB so as to be allocated with uplink resources to transmit the BSR. Either a single-bit scheduling request is sent over the PUCCH (dedicated scheduling request, D-SR), or the random access procedure is performed to request an allocation of an uplink radio resource for sending a BSR.

However, for sake of completion it should be noted that the UE will not trigger the transmission of the Scheduling Request for the case that a periodic BSR is to be transmitted.

Furthermore, an enhancement to the SR transmission has been introduced for the specific scheduling mode where resources are persistently allocated with a defined periodicity in order to save L1/L2 control signaling overhead for transmission grants, which is referred to as semi-persistent scheduling (SPS). One example for a service, which has been mainly considered for semi-persistent scheduling, is VoIP. Every 20 ms a VoIP packet is generated at the Codec during a talking spurt. Therefore, the eNodeB can allocate uplink or respectively downlink resources persistently every 20 ms, which could then be used for the transmission of VoIP packets. In general, SPS is beneficial for services with predictable traffic behavior, i.e., constant bit rate, packet arrival time is periodic. For the case where SPS is configured for the uplink direction, the eNodeB can turn off SR triggering/transmission for certain configured logical channels, i.e., BSR triggering due to data arrival on those specific configured logical channels will not trigger an SR. The motivation for such kind of enhancements is that sending a Scheduling Request for those logical channels which will use the semi-persistently allocated resources (logical channels which carry VoIP packets) is of no value for eNB scheduling and hence should be avoided.

Disadvantages of the Prior Art

A current work item in LTE relates to RAN Enhancements for Diverse Data Applications. The idea is to enhance current mobile networks to better support smartphones, laptops, netbooks, tablets and embedded modems running a wide variety of data applications, often in parallel. The main goal is to identify and specify mechanisms at the radio access network level that enhance the ability of LTE to handle diverse traffic profiles. The diversity and unpredictable nature of application traffic profiles leads to challenges in optimizing the network and in guaranteeing efficient operation under all use cases. RRC state control mechanisms and DRX configurations may be optimized with particular applications in mind, but these may not remain optimal as different applications are installed/started/stopped on the device and as the consequent traffic profile of the device changes over time. A further aim is to reduce the power usage of the terminals in order to extend the battery life. Also, for certain MTC devices low power consumption might be a very critical requirement.

The currently standardized reporting of the buffer status report and the scheduling request is not power efficient, as will be explained in the following with reference to FIG. 9.

FIG. 9 illustrates in an exemplary way the UE behavior relating to BSR/SR when data arrives in the transmission buffer of the UE (UE Tx buffer). For explanatory purposes the following somewhat simplified scenario is assumed. Only one transmission buffer and one logical channel of a UE is considered. The transmission buffer is assumed to be empty at the beginning, i.e., no data is stored in the transmission buffer. Furthermore, the UE shall not have sufficient uplink resources to transmit a buffer status report to the eNodeB. However, the UE shall have semi-statically (by means of RRC signaling) allocated resources available in the PUCCH for transmitting a scheduling request (also referred to as dedicated scheduling request, D-SR), when necessary.

Of course, the problem applies correspondingly to transmission buffers of other logical channels, as well as to a logical channel group where the transmission buffers of the logical channels grouped into the logical channel group are considered together. Also, the transmission buffer(s) need not be empty; in said case however, the new data (i.e., the data that currently arrives) entering the transmission buffer of the UE shall have a higher priority than the data already previously stored in the transmission buffer. Instead of using the allocated resources of the PUCCH for transmitting the SR, the UE might have to perform a RACH procedure to transmit the scheduling request in case no such D-SR uplink resources are available.

When new data arrives in the transmission buffer of the UE at time t1, the UE has to first request uplink resources for transmission of the data since no appropriate uplink resources are momentarily available in said respect. Thus, according to the standard trigger condition as explained above, a BSR is triggered in the UE, and in view of the lack of uplink resources for transmitting even the BSR, a scheduling request is triggered in the UE for transmission.

The UE uses the allocated PUCCH resources (or RACH procedure not shown in FIG. 9) to transmit the scheduling request to the eNodeB so as to request the eNodeB to allocate uplink resources to the UE. Accordingly, the eNodeB allocates some UL-SCH resources to the UE. Depending, e.g., on the current resource usage in the uplink, the eNodeB may allocate less or more uplink resources to the UE in response to the SR, and will transmit a corresponding uplink grant via the PDCCH.

Upon receiving the uplink grant message, the UE may or may not transmit data in addition to the BSR, depending on the amount of allocated PUSCH resources. When generating the BSR, this is considered by the UE, such that the BSR indicates the amount of data in the transmission buffer after transmitting the BSR and possibly data of the transmission buffer.

Thus, the UE will transmit over the PUSCH only the BSR or may also include some data of the UE transmission buffer. In FIG. 9 in the first signaling exchange, it is assumed that the UE can transmit all data of the transmission buffer to the eNodeB using the uplink resources assigned by the eNodeB in response to the SR. Correspondingly, the BSR informs the eNodeB about basically an empty transmission buffer, such that no further uplink grant is necessary to be allocated.

However, usually more than one uplink transmission will be necessary in order to empty the transmission buffer, as is also illustrated in FIG. 9 in connection with new data arriving at time t2. In this case, the amount of data is larger than the data becoming available in the transmission buffer at time t1. However, the above procedure basically repeats itself as illustrated, with the exception that the PUSCH transmission, including the BSR and the data, does not suffice to empty the transmission buffer. Correspondingly, the BSR generated by the UE at the time of transmission informs the eNodeB about the remaining data in the transmission buffer. The eNodeB thus will allocate to the UE further uplink resources in correspondence with the remaining data in the transmission buffer. An uplink grant message is transmitted by the eNodeB to the UE, which in turn can then use the assigned uplink resources to transmit the remaining data and thus empty its transmission buffer.

Each time new data arrives in the buffer, one of the above procedure will be repeated. Hence, e.g., for low-volume background services/Instant Messaging services where only a small amount of data needs to be transmitted in certain frequent intervals (though intervals does not need to be periodically) the currently defined BSR/SR procedure as of FIG. 9 is not efficient from the transmission power point of view. The frequent transmissions of SR/BSR consumes a lot of transmit power at the UE. Further, also the PDCCH overhead (i.e., uplink grants) cannot be neglected since the eNodeB needs to issue many PDCCHs in order to schedule frequent PUSCH transmissions.

SUMMARY OF THE INVENTION

The present invention strives to avoid the various disadvantages mentioned above.

One object of the invention is to propose a mechanism for an improved scheduling request operation at the mobile terminal.

The object is solved by the subject matter of the independent claims. Advantageous embodiments are subject to the dependent claims.

According to a first aspect, the invention suggests an improvement to the scheduling request transmission and thus to how resources are requested by the user equipment. One of the main points regarding this first aspect is that the transmission of a scheduling request shall be postponed for particular situations in order to improve the power efficiency of the UE. How this delaying of the transmission of the scheduling request may be achieved will be explained in the following.

Basically the same scenario is assumed as done with regard to FIG. 9 and the explanation of the problem. In particular, a user equipment in a communication system is supposed to have at least one transmission buffer for temporarily storing data to be transmitted in the uplink to a radio base station. Also, the user equipment shall have no uplink resources available to transmit the buffer status report or any other kind of user data; nevertheless and though not necessary for the purpose of this invention, the user equipment may have allocated periodic resources in the uplink control channel, sufficient to transmit a scheduling request (usually one bit) when necessary, but not enough to transmit more data.

In order to delay the transmission of the scheduling request, the triggering of same is made threshold-dependent. More specifically, two trigger conditions are defined in the UE, which when both are fulfilled eventually leads to the transmission of the scheduling request; both trigger conditions relate to triggering a transmission of a buffer status report to the radio base station, which in the absence of appropriate uplink resources directly causes the transmission of a scheduling request to request allocation of appropriate uplink resources for the transmission of the buffer status report (and possibly used for transmission of data too).

The first trigger condition advantageously relates to new data becoming available in the transmission buffer; in other words, in order for the first trigger condition to be fulfilled, new data shall have to be transmitted by the user equipment and thus enters the corresponding transmission buffer of the user equipment. This is independent of whether the transmission buffer is empty or not.

The second trigger condition relates to the data in the transmission buffer of the user equipment to exceed some threshold. One possibility is that the second trigger condition comes true when the amount of data in the transmission buffer is higher than a predetermined amount of data, i.e., surpasses a data quantity threshold. Another possibility is to predetermine an amount of time, and starting when new data arrives in an empty transmission buffer, the second trigger condition triggers when the predetermined amount of time expires. Preferably, it should be noted that said timer is not restarted (or reset) every time new data arrives in the transmission buffer, but only once when "first" new data arrives in an empty transmission buffer. Considering periodic uplink services where data is periodically generated and entered into the transmission buffer to be transmitted to the radio base station, the use of such a timer has quite a similar effect as when using a data quantity threshold which has to be exceeded by the amount of data in the transmission buffer for the second trigger condition to be fulfilled.

These two possibilities for the second trigger condition are however not the same, as apparent when considering that the expiry of a timer might happen even without new data arriving. Thus, when the second trigger condition requires a data quantity threshold to be exceeded, this can basically only happen when new data arrives in the transmission buffer thus executing the first trigger condition, and the first and the second trigger condition are fulfilled at basically the same time. Of course, also in this case, instead of checking the first trigger condition every time new data arrives, the fact that the first trigger condition is fulfilled can be stored the first time it is determined and as long as the second trigger condition is checked, such that when the second trigger condition is determined to be fulfilled the scheduling request is triggered without checking again the first trigger condition.

In contrast thereto, in case a timer is used as the second trigger condition, the first trigger condition does not have to be fulfilled for the second trigger condition to be fulfilled; thus, with this timer possibility, the user equipment may store that the first trigger condition is fulfilled as long as this timer runs, in which case when the timer expires, both trigger conditions are considered to come true by the user equipment.

According to one variant of this first aspect, the buffer status report, and thus the scheduling request, is only triggered in case both trigger conditions are fulfilled; in other words, only when new data arrives in the transmission buffer and data in the transmission buffer is more than a predetermined amount of data (or a timer, started when new data arrives in the empty transmission buffer, expires).

Correspondingly, when both trigger conditions are fulfilled, the user equipment triggers the transmission of a buffer status report, and as a direct consequence (assuming no appropriate uplink resources are available), it can be said to trigger the transmission of a scheduling request. The scheduling request is transmitted to the radio base station, either using an uplink control channel with allocated persistent resources (PUCCH) or using a random access procedure (RACH).

In a variant of the first aspect, the above-mentioned first trigger condition can be defined in accordance with the 3GPP standard (se background section), i.e., new data arrives in the transmission buffer when the transmission buffer is empty, and when the transmission is not empty (i.e., data is already stored in the transmission buffer awaiting uplink transmission) the first trigger condition shall be only fulfilled, in case the new data has a higher priority than the data already stored in the transmission buffer. In said case however, the user equipment may store the information of the first trigger condition being fulfilled for the following reason. Assuming that the first trigger condition is defined as currently in the standard, when the transmission buffer is not empty, and new data arrives, the first trigger condition would not be fulfilled, since the newly arrived data does not necessarily have a higher priority, but most likely the same priority, as the data already stored in the transmission buffer. When new data arrives in an empty buffer, and the first trigger condition is true, this information of the first trigger condition being fulfilled is stored while determining whether the second trigger condition is fulfilled. By keeping the first trigger condition true for as long as necessary, when determining whether the second trigger condition is fulfilled it is possible to delay the triggering of the buffer status report/scheduling request compared to the standard way of triggering.

According to a second aspect which can be used in combination or independent from the above first aspect, the time during which the user equipment monitors the downlink control channel for an uplink grant after sending the scheduling request via the dedicated resources of the uplink control channel (PUCCH) is shortened. As explained with respect to the first aspect, the user equipment sends a scheduling request requesting resources for uplink transmissions of the buffer status report and/or uplink user data. The scheduling request may be transmitted by using statically assigned resources of the PUCCH (D-SR). Instead of monitoring the downlink control channel for the corresponding uplink grant from the base station immediately upon transmitting the dedicated scheduling request, it is advantageous to delay the monitoring for a particular time, such that the user equipment only starts monitoring the downlink control channel after a particular amount of time has passed. Considering that the dedicated scheduling request needs to be transmitted over the radio link, needs to be processed at the base station and the base station needs to transmit the corresponding uplink grant over the radio link back to the user equipment, the monitoring of the downlink control channel (i.e., PDCCH) can be deferred by some time without running the risk of "missing" the downlink control channel (PDCCH) with the uplink grant. A possible delay may be, e.g., 3 subframes, but may also be configured to be less or more than that.

The advantage provided by this second aspect is that the user equipment does not need to be awake after sending the dedicated scheduling request and before starting to monitor the downlink control channel, thereby saving power.

Additionally, the monitoring of the downlink control channel can be either stopped when receiving the corresponding downlink control channel with the uplink grant or can be stopped before by setting a timer, which is used to stop the downlink control channel monitoring by the user equipment even if no uplink grant is received.

According to a third aspect which can be used in combination or independent from the above first and second aspects, the retransmission protocol employed between the user equipment and the base station is improved by defining that receiving an acknowledgement via a downlink feedback channel from the base station without a corresponding downlink control channel will trigger the user equipment to stop monitoring the downlink control channel. In more detail, a retransmission or feedback protocol is used by the user equipment and the base station to negatively or positively acknowledge an uplink transmission by the user equipment. A downlink feedback channel is used to transport the negative/positive acknowledgement to the user equipment, and the user equipment accordingly monitors same to receive the acknowledgement, every time after it transmits uplink data.

In addition, the user equipment monitors the downlink control channel for a retransmission request sent by the base station, in case the base station requests the user equipment to retransmit a previous uplink transmission of data. The instruction over the downlink control channel and the acknowledgement via the downlink feedback channel do not need to coincide; for example, the downlink control channel might instruct the user equipment to retransmit data, even though the downlink feedback channel transported a positive acknowledgement. In those cases, the instruction from the downlink control channel overwrites the indication from the downlink feedback channel. However, up to now, when the user equipment receives a positive acknowledgement from the base station, without receiving a corresponding instruction via the downlink control channel, the user equipment does not perform a retransmission or new transmission, but keeps the data in the buffer of the retransmission protocol while further monitoring the downlink control channel for further instructions over the downlink control channel.

According to this third aspect, when the user equipment receives a positive acknowledgement regarding previously transmitted data without receiving a corresponding downlink control channel, it stops monitoring the downlink control channel for further instructions. This reduces the active time of the user equipment thus allowing to further reduce the power usage.

A fourth aspect, which can be used in combination or independent from the above first, second and third aspects, introduces a scheme to allow restricting the use of dedicated scheduling request resources depending on the priority or kind of data triggering the corresponding scheduling request. As explained before, static resources of an uplink control channel are available to the user equipment to transmit the scheduling request via the uplink control channel; they may be termed dedicated scheduling request resources. The dedicated scheduling request resources are periodic in time. Scheduling requests are indirectly triggered by data arriving in a transmission buffer, as explained in detail before. The data belongs to a logical channel which is associated with a particular priority; thus, the scheduling request can be said to have a priority too, namely the priority of the data which triggered the scheduling request.

According to the fourth aspect, the periodic dedicated scheduling request resources are assigned a priority threshold restricting the use of said particular resource to only those scheduling requests that have a high enough priority. In particular, preferably if the priority of the scheduling request surpasses (or at least equals) the priority threshold required for the dedicated scheduling request resource, the user equipment can actually use said resource to transmit the scheduling request. In case the priority of the scheduling request does not exceed (or equal) the priority threshold for the dedicated resource, the user equipment needs to wait for the next dedicated scheduling request resource and again compare the scheduling request priority against the required priority threshold of the dedicated scheduling request resource. Correspondingly, there are defined dedicated scheduling request resources that can be used for both low and high priority scheduling requests, as well as other dedicated scheduling request resources that are restricted to high priority scheduling requests only.

One implementation of the fourth aspect defines two (or more) cycles for these dedicated scheduling request resources. The first cycle may refer to a, e.g., low required priority, and the second cycle may refer to a, e.g., high required priority. Every n-th periodic resource is assigned to the first low-priority cycle, every m-th periodic resource is assigned to the second high-priority cycle.

Preferably, every dedicated scheduling request resource should be usable for high priority scheduling requests, such that the second cycle may be basically the cycle of the dedicated scheduling request resource itself. On the other hand, not every periodic resource shall be usable for low priority scheduling requests, such that the scheduling requests for low priority data are postponed until a corresponding periodic resource of the first cycle.

A variation of the fourth aspect assumes that scheduling requests are not only transmitted via the primary cell of the system, but may also be transmitted using a secondary cell of the system. Periodic dedicated scheduling request resources are defined for the primary as well as the secondary cell, usable by the user equipment to transmit a scheduling request. In this variation the periodic resources of the primary cell may only be used for transmitting a scheduling request triggered by high priority data (i.e., exceeding or at least equaling a corresponding predetermined priority threshold assigned to the primary cell's periodic dedicated scheduling request resources). Conversely, the dedicated resources of the secondary cell may be used for transmitting scheduling requests triggered by low priority data; of course, these resources might also be used for high priority scheduling requests if necessary.

Another variation differentiates between the kind of data that triggers the scheduling request, e.g., between control and user data. In this case, the dedicated scheduling request resources of the primary cell may only be used for transmitting a scheduling request triggered by control data, whereas the dedicated resources of the secondary cell may be used mainly for transmitting a scheduling request triggered by user data.

The present invention provides a method for requesting resources by a user equipment in a communication system, wherein the user equipment comprises a transmission buffer for temporarily storing data to be transmitted in the uplink to a radio base station. A first trigger condition and a second trigger condition are defined, the first trigger condition requiring arrival of new data in the transmission buffer, and the second trigger condition requiring a value associated with the data in the transmission buffer to exceed a predetermined threshold value. The user equipment determines whether the first trigger condition is fulfilled. When the first trigger condition is fulfilled, the user equipment determines whether the second trigger condition is fulfilled. The user equipment transmits a scheduling request to the radio base station for requesting uplink resources, in case it is determined that the second trigger condition is fulfilled.

According to an advantageous embodiment of the invention which can be used in addition or alternatively to the above, the first and second trigger conditions are defined for triggering the transmission of a buffer status report; the triggering of the buffer status report triggers a transmission of the scheduling request in case no uplink resources are available for the user equipment to transmit the buffer status report.

According to an advantageous embodiment of the invention which can be used in addition or alternatively to the above, the second trigger condition requires that the amount of data in the transmission buffer exceeds the predetermined threshold value, or requires that the time the data is in the transmission buffer exceeds the predetermined threshold value.

According to an advantageous embodiment of the invention which can be used in addition or alternatively to the above, the first trigger condition requires: new data to arrive in the transmission buffer, when the transmission buffer is empty, or new data to arrive in the transmission buffer and this new data to be of higher priority than data already in the transmission buffer, when the transmission buffer is not empty. The user equipment stores that the first trigger condition is fulfilled, upon determining that new data arrived in the empty transmission buffer.

According to an advantageous embodiment of the invention which can be used in addition or alternatively to the above, a plurality of logical channels are configured for the user equipment, and one transmission buffer is provided in the user equipment for each logical channel. The determining of whether the second trigger condition is fulfilled is only performed for at least one out of the plurality of logical channels. In an advantageous embodiment this is done for a logical channel associated with data of low priority.

According to an advantageous embodiment of the invention which can be used in addition or alternatively to the above, a plurality of logical channels are configured for the user equipment, and one transmission buffer is provided in the user equipment for each logical channel. The determining of whether the second trigger condition is fulfilled is only performed for at least one out of different logical channel groups into which the plurality of logical channels are grouped. In an advantageous embodiment this is done for a logical channel group associated with data of low priority. The second trigger condition requires that the sum of data in the transmission buffers of the logical channels of the logical channel group exceeds the predetermined threshold value.

According to an advantageous embodiment of the invention which can be used in addition or alternatively to the above, the scheduling request is transmitted from the user equipment to the radio base station in a resource of an uplink control channel or via a random access procedure.

According to an advantageous embodiment of the invention which can be used in addition or alternatively to the above, the predetermined threshold value is predetermined by the user equipment. In an advantageous embodiment, this is done based on stored traffic history data, and the user equipment transmits the predetermined threshold value to the radio base station. Alternatively, the predetermined threshold value is predetermined by a node of the communication system other than the user equipment, advantageously based on traffic history data received from the user equipment.

According to an advantageous embodiment of the invention which can be used in addition or alternatively to the above, the user equipment receives an uplink grant message from the radio base station, including information on uplink resources allocated to the user equipment by the radio base station. The user equipment transmits a buffer status report, and optionally at least part of the data in the transmission buffer, to the radio base station, using the allocated uplink resources included in the uplink grant message.

According to an advantageous embodiment of the invention which can be used in addition or alternatively to the above, the user equipment monitors a downlink control channel, and starts monitoring the downlink control channel a predetermined time after transmitting the scheduling request to the radio base station. In an advantageous embodiment, the monitoring is performed until either the user equipments receives an uplink grant message via the downlink control channel or a second predetermined time after transmitting the scheduling request expires.

According to an advantageous embodiment of the invention which can be used in addition or alternatively to the above, the user equipment transmits data to the radio base station, and monitors a downlink feedback channel for a positive or negative acknowledgment message from the radio base station, after transmitting the data to the radio base station. The user equipment further monitors a downlink control channel for a retransmission request message from the radio base station, after transmitting the data to the radio base station, the retransmission request message requesting the user equipment to retransmit the data. The monitoring of the downlink control channel for the retransmission request message from the radio base station is stopped, when receiving a positive acknowledgment message via the downlink feedback channel without receiving the downlink control channel.

According to an advantageous embodiment of the invention which can be used in addition or alternatively to the above, periodic resources associated with an uplink control channel are allocated to the user equipment and are usable by the user equipment to transmit a scheduling request to the radio base station. Each of the periodic resources associated with the uplink control channel is assigned a required priority. The triggered scheduling request is assigned a scheduling request priority which corresponds to the priority of the data which triggered the transmission of the scheduling request. In an advantageous embodiment, the priority of the data corresponds to the priority of the logical channel associated with said data. Each of said periodic resources is only usable for transmitting scheduling requests with the scheduling request priority being equal to or higher than the required priority of the periodic resource.

According to an advantageous embodiment of the invention which can be used in addition or alternatively to the above, the user equipment determines whether the scheduling request priority is equal to or higher than the required priority of the periodic resource of the uplink control channel. In case it is determined that the scheduling request priority is equal to or higher than the required priority of the periodic resource, the scheduling request is transmitted using the periodic resource. In case it is determined that the scheduling request priority is not equal to or higher than the required priority of the periodic resource, the user equipment determines whether the scheduling request priority is equal to or higher than the required priority of a next periodic resource of the uplink control channel.

According to an advantageous embodiment of the invention which can be used in addition or alternatively to the above, at least a first and second scheduling request cycle are defined for the periodic resources of the uplink control channel, such that every n-th periodic resource of the uplink control channel is associated with the first scheduling request cycle and every m-th periodic resource of the uplink control channel is associated with the second scheduling request cycle, where m≠n. The first scheduling request cycle is assigned a first required priority and the second scheduling request cycle is assigned a second required priority.

According to an advantageous embodiment of the invention which can be used in addition or alternatively to the above, carrier aggregation is used between the user equipment and the base station, with a primary carrier and a secondary carrier. Periodic resources for the primary carrier and periodic resources for the secondary carrier are allocated to the user equipment and are usable by the user equipment to transmit a scheduling request to the radio base station. The periodic resources for the primary carrier are used for transmitting a scheduling request triggered by first kind of data, and the periodic resources for the secondary carrier are used for transmitting a scheduling request triggered by second kind of data.

According to an advantageous embodiment of the invention which can be used in addition or alternatively to the above, the first kind of data is data with a priority exceeding a predetermined priority threshold of the periodic resources for the primary carrier, and the second kind of data is data with a priority equal to or below the predetermined priority threshold. Alternatively, the first kind of data is control plane data, and the second kind of data is user plane data.

The present invention further provides a user equipment for requesting resources in a communication system. A transmission buffer of the user equipment temporarily stores data to be transmitted in the uplink to a radio base station. A memory of the user equipment stores a first trigger condition and a second trigger condition, the first trigger condition requiring the arrival of new data in the transmission buffer, and the second trigger condition requiring a value associated with the data in the transmission buffer to exceed a predetermined threshold value. A processor of the user equipment determines whether the first trigger condition is fulfilled. The processor further determines whether the second trigger condition is fulfilled, when the first trigger condition is fulfilled. A transmitter of the user equipment transmits a scheduling request to the radio base station for requesting uplink resources, in case the processor determined that the second trigger condition is fulfilled.

According to an advantageous embodiment of the invention which can be used in addition or alternatively to the above, the first and second trigger conditions are defined for triggering the transmission of a buffer status report. The triggering of the buffer status report triggers the transmission of the scheduling request in case no uplink resources are available for the user equipment to transmit the buffer status report.

According to an advantageous embodiment of the invention which can be used in addition or alternatively to the above, the second trigger conditions requires:
the amount of data in the transmission buffer exceeds the predetermined threshold value, or
the time the data is in the transmission buffer exceeds the predetermined threshold value.

According to an advantageous embodiment of the invention which can be used in addition or alternatively to the above, the first trigger condition requires:
new data to arrive in the transmission buffer, when the transmission buffer is empty, or
new data to arrive in the transmission buffer and this new data to be of higher priority than data already in the transmission buffer, when the transmission buffer is not empty.

The memory further stores that the first trigger condition is fulfilled, upon the processor determined that new data arrived in the empty transmission buffer.

According to an advantageous embodiment of the invention which can be used in addition or alternatively to the above, a plurality of logical channels are configured for the user equipment, and the user equipment comprises one transmission buffer for each logical channel. The processor performs the determination of whether the second trigger condition is fulfilled for only at least one out of the plurality of logical channels. In an advantageous embodiment this is done for a logical channels associated data of low priority.

According to an advantageous embodiment of the invention which can be used in addition or alternatively to the above, a plurality of logical channels are configured for the user equipment, and one transmission buffer is provided in the user equipment for each logical channel. The processor performs the determination of whether the second trigger condition is fulfilled only for at least one out of different logical channel groups, into which the plurality of logical channels are grouped. In an advantageous embodiment this is done for a logical channel group associated with data of low priority. The processor calculates the sum of data in the transmission buffers of the logical channels of the logical channel group, and determines when the calculated data sum exceeds the predetermined threshold value.

According to an advantageous embodiment of the invention which can be used in addition or alternatively to the above, the transmitter is adapted to transmit the scheduling request to the radio base station in a resource of an uplink control channel or via a random access procedure.

According to an advantageous embodiment of the invention which can be used in addition or alternatively to the above, the processor predetermines the predetermined threshold value. In an advantageous embodiment this is done based on stored traffic history data, and the transmitter is preferably adapted to transmit the predetermined threshold value to the radio base station. The transmitter transmits stored traffic history data to a network entity that predetermines the predetermined threshold value, and a receiver of the user equipment receives the predetermined threshold value from said network entity.

According to an advantageous embodiment of the invention which can be used in addition or alternatively to the above, a receiver receives an uplink grant message from the radio base station, including information on uplink resources allocated to the user equipment by the radio base station. The transmitter transmits a buffer status report, and optionally at least part of the data in the transmission buffer, to the radio base station, using the allocated uplink resources included in the uplink grant message.

According to an advantageous embodiment of the invention which can be used in addition or alternatively to the above, a monitoring circuit monitors a downlink control channel and starts monitoring the downlink control channel a predetermined time after transmitting the scheduling request to the radio base station. In an advantageous embodiment, the monitoring circuit monitors the downlink control channel until either the user equipment receives an uplink grant message via the downlink control channel or a second predetermined time after transmitting the scheduling request expires.

According to an advantageous embodiment of the invention which can be used in addition or alternatively to the above, the transmitter transmits data to the radio base station. A monitoring circuit monitors a downlink feedback channel for a positive or a negative acknowledgement message from the radio base station, after transmitting the data to the radio base station. The monitoring circuit monitors a downlink control channel for a retransmission request message from the radio base station, after transmitting the data to the radio base station, the retransmission request message requesting the user equipment to retransmit the data. The monitoring circuit stops the monitoring of the downlink control channel, when receiving a positive acknowledgment message via the downlink feedback channel without receiving the downlink control channel.

According to an advantageous embodiment of the invention which can be used in addition or alternatively to the above, periodic resources associated with an uplink control channel are allocated to the user equipment and are usable to transmit a scheduling request to the radio base station. Each of the periodic resources associated with the uplink control channel is assigned a required priority, and wherein the triggered scheduling request is assigned a scheduling request priority, which corresponds to the priority of the data that triggered the transmission of the scheduling request, and preferably the priority of the data corresponds to the priority of the logical channel associated with said data. Each of said periodic resources is only usable for transmitting scheduling requests with the scheduling request priority being equal to or higher than the required priority of the periodic resource.

According to an advantageous embodiment of the invention which can be used in addition or alternatively to the above, the processor determines whether the scheduling request priority is equal to or higher than the required priority of the periodic resource of the uplink control channel. In case it is determined that the scheduling request priority is equal to or higher than the required priority of the periodic resource, the scheduling request is transmitted using that resource. In case it is determined that the scheduling request priority is not equal to or higher than the required priority of the periodic resource, the processor determines whether the scheduling request priority is equal to or higher than the required priority of a next periodic resource of the uplink control channel.

According to an advantageous embodiment of the invention which can be used in addition or alternatively to the above, at least a first and second scheduling request cycle are defined for the periodic resources of the uplink control channel, such that every n-th periodic resource of the uplink control channel is associated with the first scheduling request cycle, and every m-th periodic resource of the uplink control channel is associated with the second scheduling request cycle, where m≠n. The first scheduling request cycle is assigned a first required priority and the second scheduling request cycle is assigned a second required priority.

According to an advantageous embodiment of the invention which can be used in addition or alternatively to the above, carrier aggregation is used between the user equipment and the base station, with a primary carrier and a secondary carrier. Periodic resources for the primary carrier and periodic resources for the secondary carrier are allocated to the user equipment and are usable by the user equipment to transmit a scheduling request to the radio base station. The periodic resources for the primary carrier are used for transmitting a scheduling request triggered by first kind of data, and the periodic resources for the secondary carrier are used for transmitting a scheduling request triggered by second kind of data.

According to an advantageous embodiment of the invention which can be used in addition or alternatively to the above, the first kind of data is data with a priority exceeding a predetermined priority threshold of the periodic resources for the primary carrier, and the second kind of data is data with a priority equal to or below the predetermined priority threshold. Alternatively, the first kind of data is control plane data, and the second kind of data is user plane data.

BRIEF DESCRIPTION OF THE FIGURES

In the following the invention is described in more detail in reference to the attached figures and drawings. Similar or corresponding details in the figures are marked with the same reference numerals.

FIG. 8 illustrates the DRX operation of a mobile terminal, and in particular the DRX opportunity, on-duration, according to the short and long DRX cycle, FIG. 9 illustrates the resource request procedure between the user equipment and the base station in view of the transmission buffer status, according to the prior art, FIG. 16 illustrates a variant of the fourth embodiment of the invention, in which dedicated scheduling request resources of a PCell and a SCell are assigned different required priorities.

DETAILED DESCRIPTION OF THE INVENTION

Figure 1:
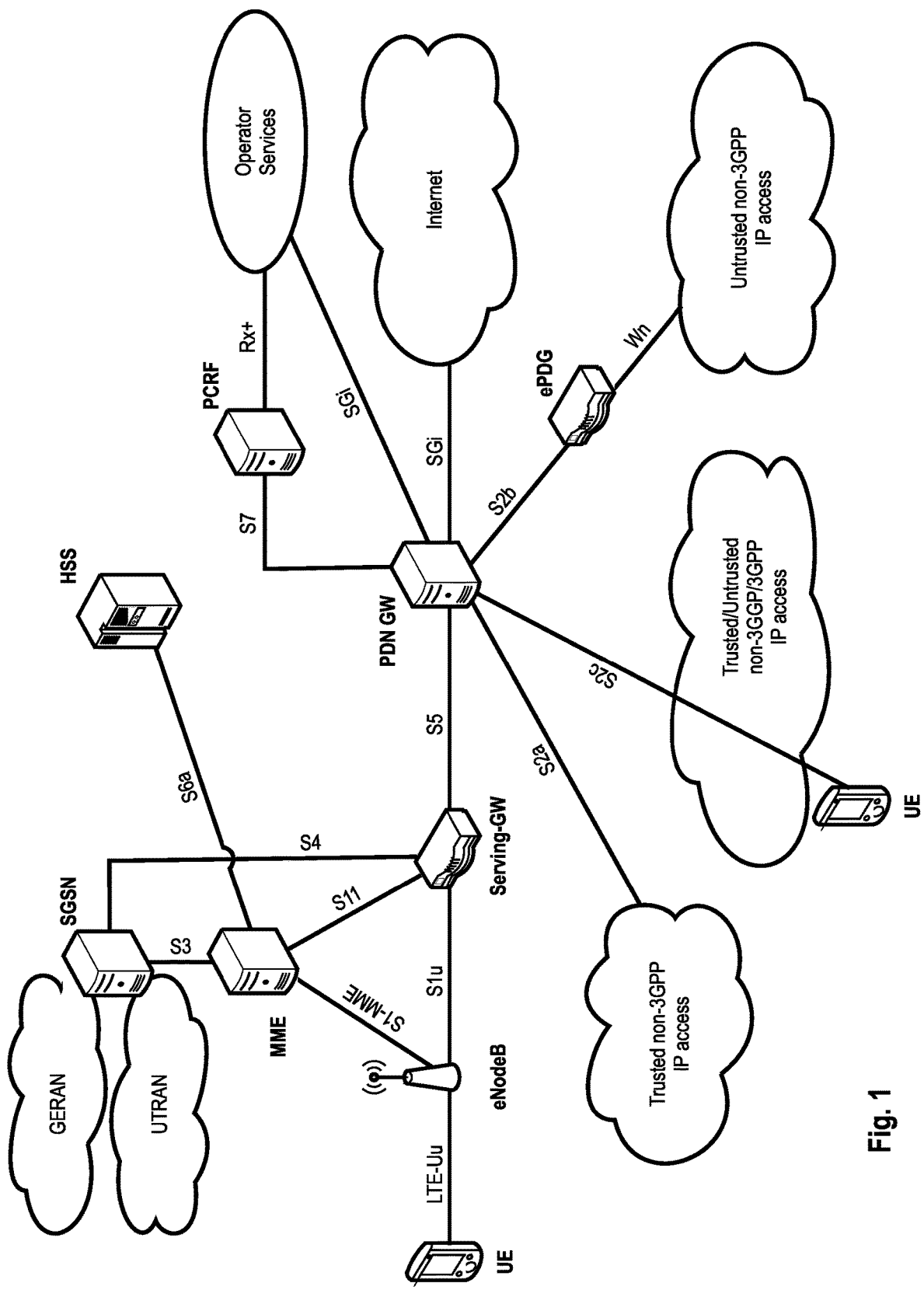
FIG. 1 shows an exemplary architecture of a 3GPP LTE system.
Figure 2:
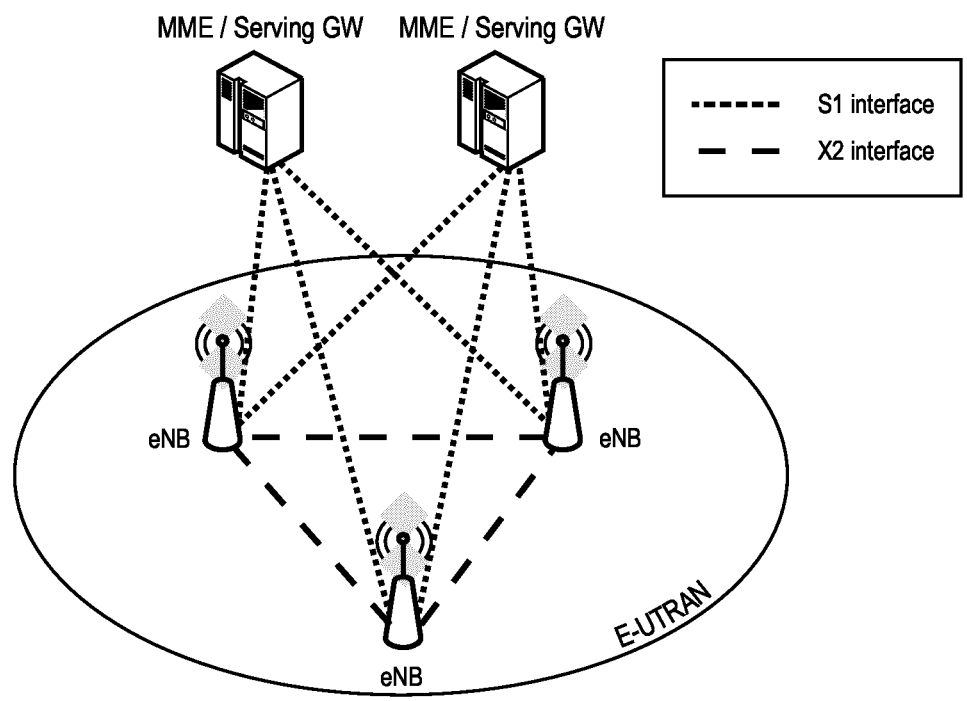
FIG. 2 shows an exemplary overview of the overall E-UTRAN architecture of 3GPP LTE.
Figure 3:
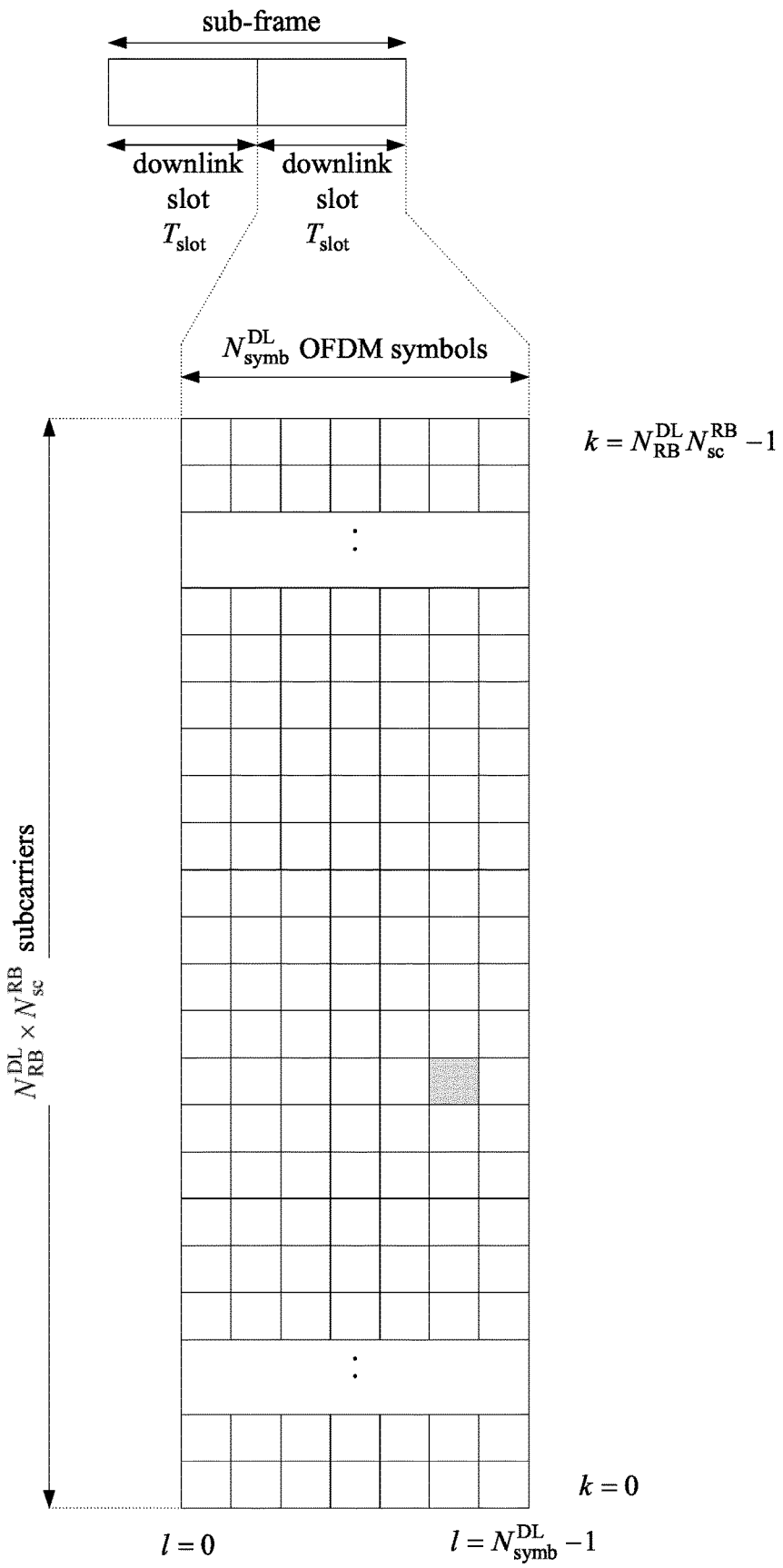
FIG. 3 shows exemplary subframe boundaries on a downlink component carrier as defined for 3GPP LTE (Release 8/9)
Figure 4:
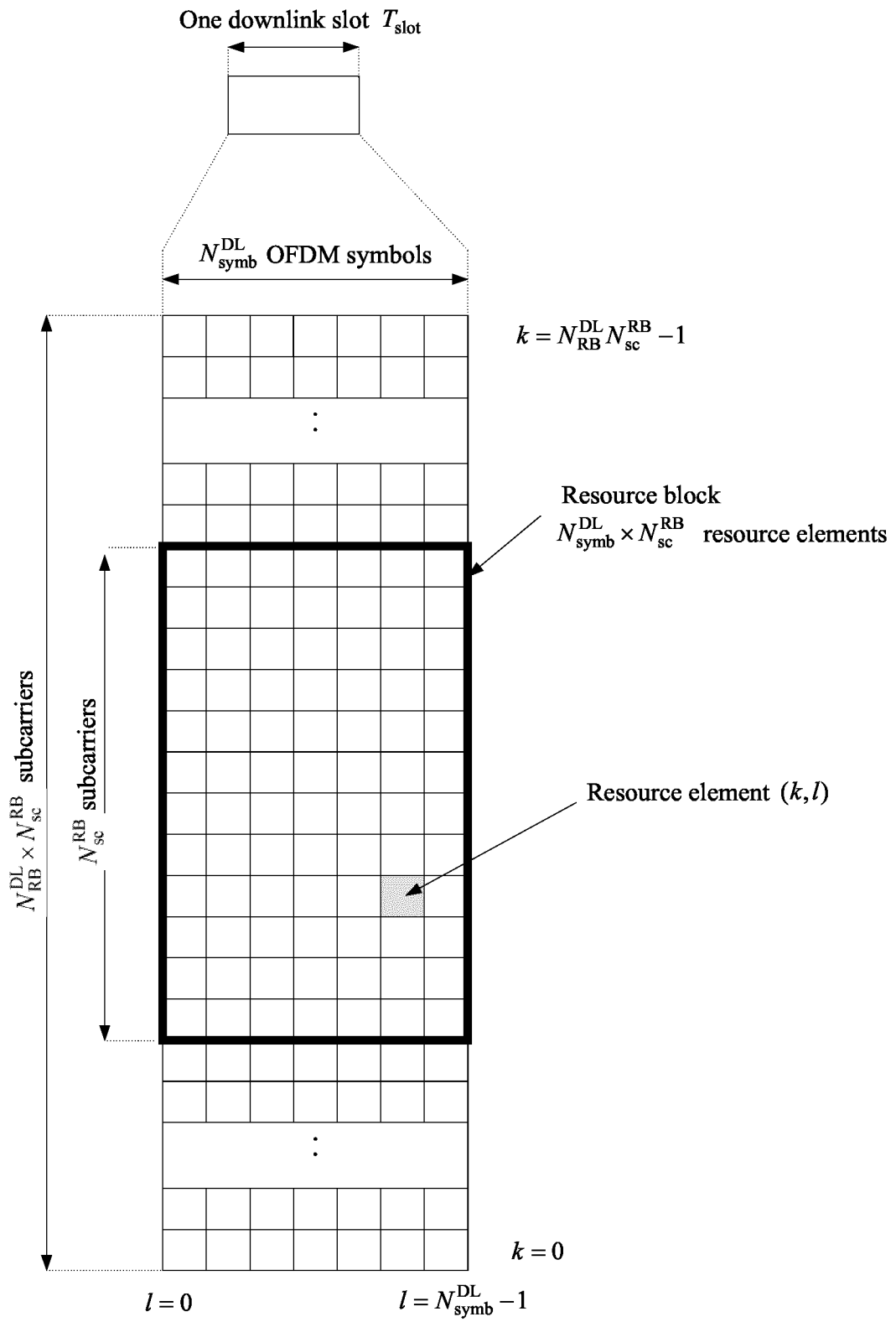
FIG. 4 shows an exemplary downlink resource grid of a downlink slot as defined for 3GPP LTE (Release 8/9)
Figure 5:
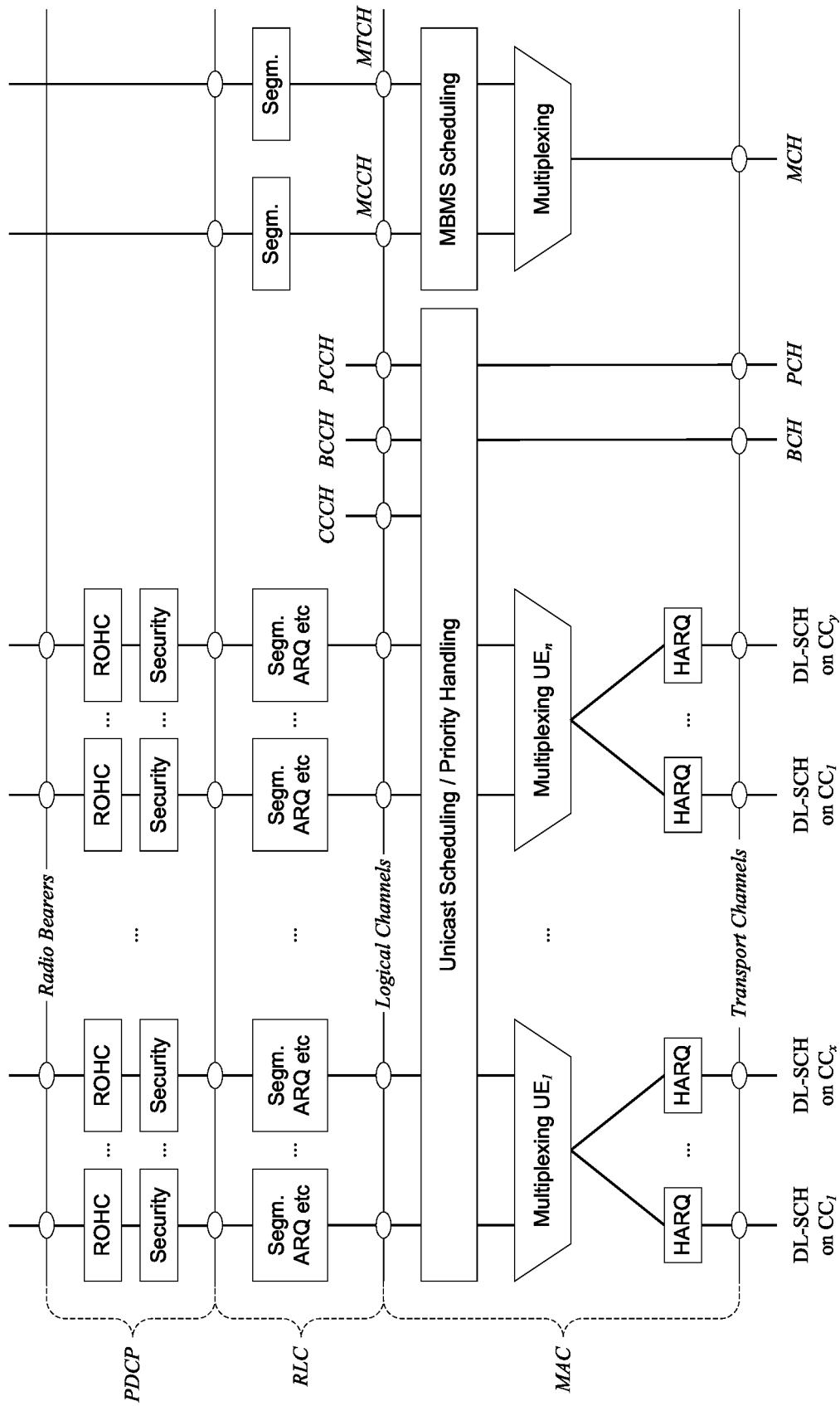
FIGS. 5 and 6 show the 3GPP LTE-A (Release 10) Layer 2 structure with activated carrier aggregation for the downlink and uplink, respectively.
Figure 6:
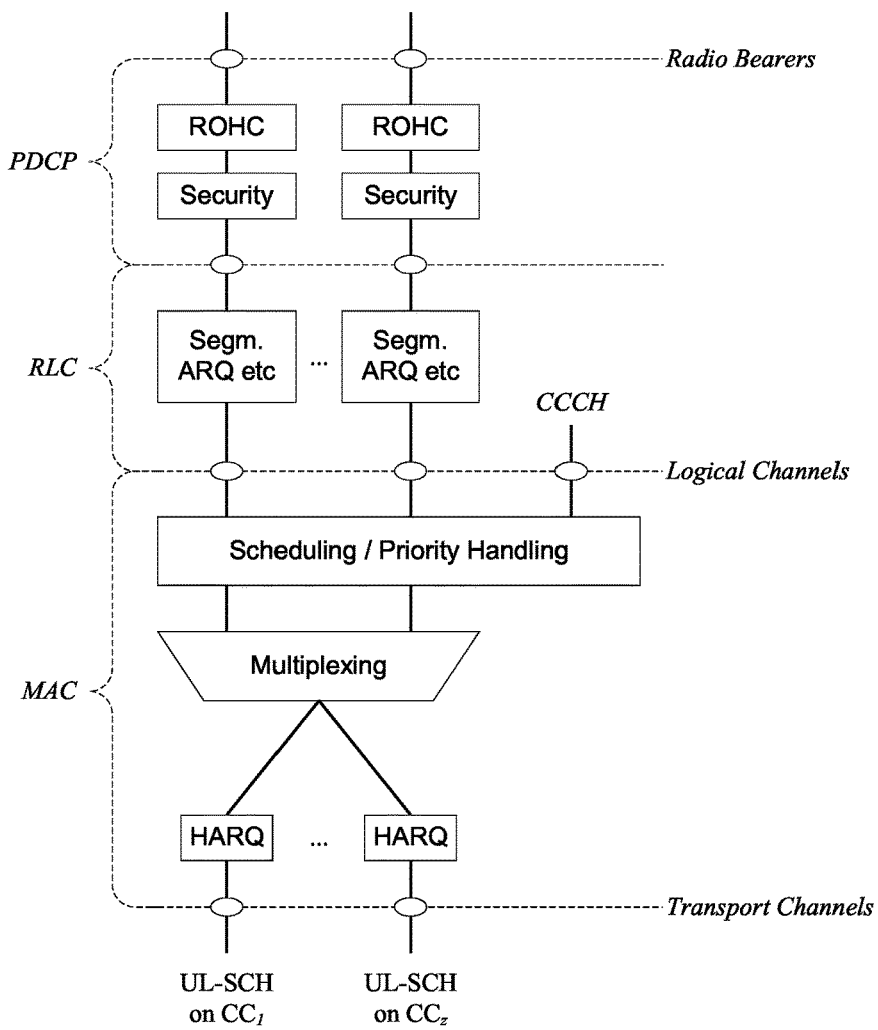
Figure 7:
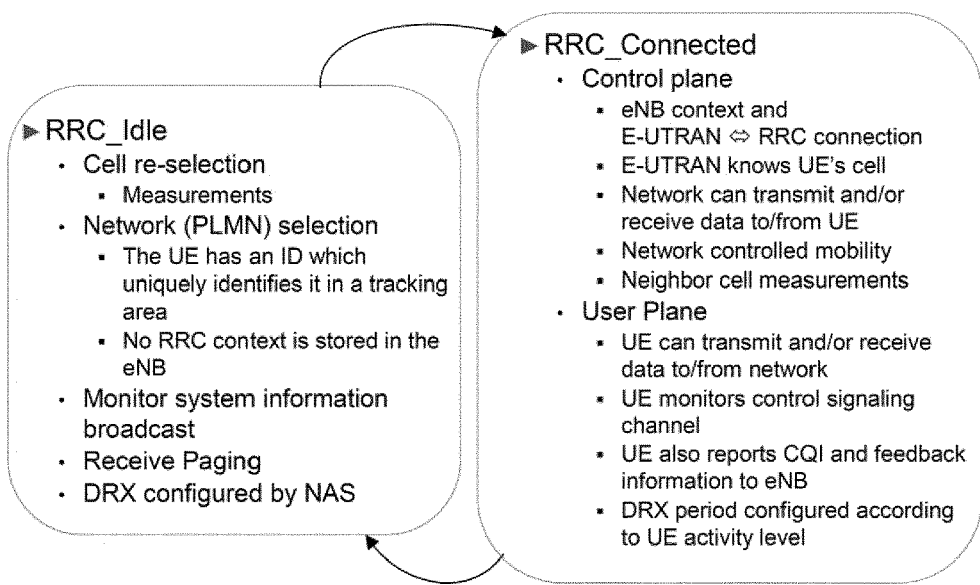
FIG. 7 shows a state diagram for a mobile terminal and in particular the states RRC_CONNECTED and RRC_IDLE and the functions to be performed by the mobile terminal in these states.

The following paragraphs will describe various embodiments of the invention. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the invention may be advantageously used for example in a mobile communication system such as 3GPP LTE-A (Release 10/11) communication systems as described in the Technical Background section above, but the invention is not limited to its use in this particular exemplary communication networks.

The term "new data" used in the claims and in the description is to be understood as data that arrives/is stored in the transmission buffer which was previously not there. This data (data packets) is received from a higher layer, e.g., PDCP layer, and placed into the transmission buffer. This term is used in contrast to "old data", referring to data which is kept in the transmission buffer as long as the retransmission protocol makes sure that this data is correctly received at the receiving side.

The terms "exceed" or "surpass" used in the claims and in the description in connection with thresholds shall not be used restrictively to mean that the threshold needs to be actually exceeded (i.e., higher than), but may also encompass that the threshold is equaled (i.e., is the same as).

The term "arrival" used in the claims and in the description with regard to data and transmission buffers shall be understood as that data which is to be transmitted by the user equipment "enters", or "is put into", or "is temporarily stored in" the transmission buffer of the corresponding logical channel for transmission.

In the following, several embodiments of the invention will be explained in detail. The explanations should not be understood as limiting the invention, but as a mere example of the invention's embodiments to better understand the invention. A skilled person should be aware that the general principles of the invention as laid out in the claims can be applied to different scenarios and in ways that are not explicitly described herein. Correspondingly, the following scenario assumed for explanatory purposes of the various embodiments shall not limit the invention as such.

A user equipment is provided with transmission buffer memory for each logical channel, used for temporarily storing uplink data until it is successfully transmitted over the radio link to the eNodeB. Furthermore, the UE has no resources available to transmit the data or a buffer status report to the base station, making it thus necessary to perform a scheduling request with the eNB, which process shall be improved by the first embodiment of the invention.

As explained before, scheduling requests may be either transmitted via resources of the PUCCH allocated by the eNB or by using a RACH procedure. If not indicated differently, in the following we will assume that such resources of the PUCCH, which are typically allocated periodically by the eNB, are available to the UE for transmitting the scheduling request as soon as it is triggered; nevertheless, the invention is also applicable when using a RACH procedure instead. A scheduling request is usually one bit long, and corresponding periodic PUCCH resources allow transmitting the scheduling request but are not sufficient for transmitting further data such as the buffer status report or actual data of the transmission buffer.

Figure 12:
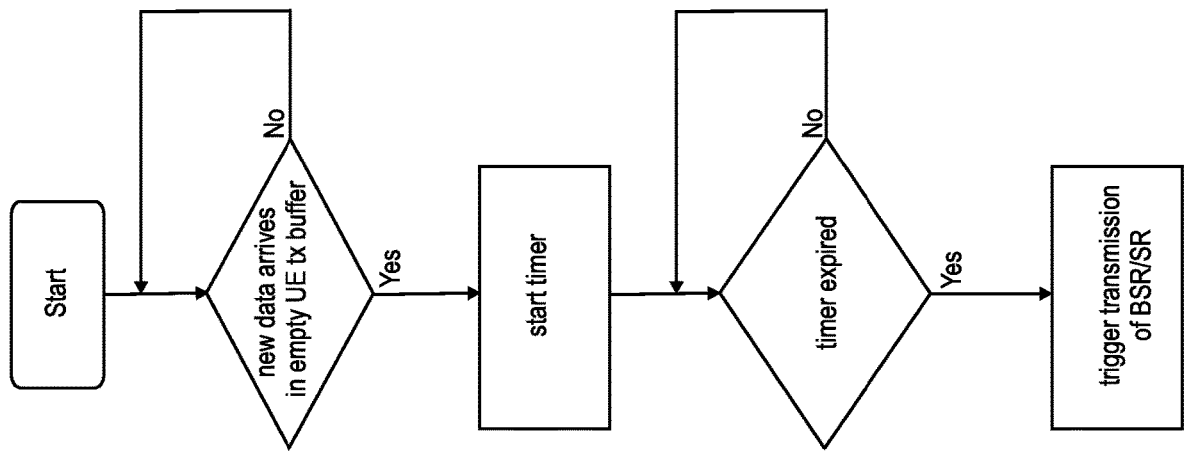
FIGS. 11 and 12 illustrate the process in the user equipment for the improved resource request procedure according to variants of the first embodiment of the invention.
Figure 13:
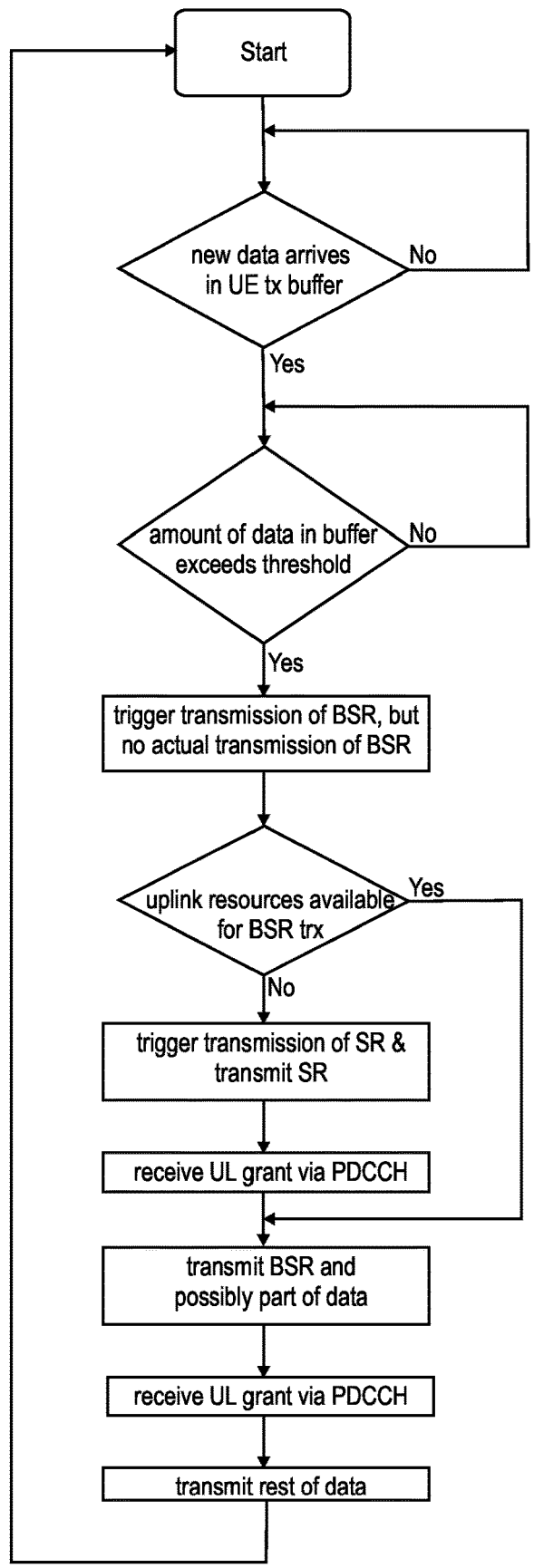
FIG. 13 illustrates the process in the user equipment for the improved resource request procedure according to a more detailed first embodiment of the invention.

A first embodiment of the invention will be explained in connection with FIG. 10, which illustrates the transmission buffer at the user equipment and the messages exchanged with the base station to request resources and transmit the buffer status report, the scheduling request and data. FIG. 11 illustrates the process at the user equipment for performing the first embodiment of the invention where the second trigger condition requires a data quantity threshold to be exceeded; FIG. 12 is an alternative to FIG. 11 and illustrates the process at the user equipment for performing the first embodiment of the invention where the second trigger condition requires a timer to expire. FIG. 13 also illustrates the process at the user equipment for performing the first embodiment of the invention but is more detailed than FIG. 11.

The main idea in this first embodiment is to delay the triggering of the buffer status report/scheduling request compared to the standard triggering procedure as explained in the Background Section in connection with FIG. 9. Postponing the buffer status report/scheduling request allows that more data arrives in the transmission buffer, and thus uplink transmissions transport more data in less time. Correspondingly, the triggering of the buffer status report/scheduling request is performed when sufficient data is in the transmission buffer (i.e., more than some predetermined threshold), and not immediately when new data arrives in the empty transmission buffer. It is more power efficient to transmit larger Transport Block sizes, rather than transmitting smaller Transport Block sizes. Also, the PDCCH load is decreased significantly as will be explained.

As in the prior art, a buffer status report may be triggered first, immediately followed by the triggering of a scheduling request provided no uplink resources are available to transmit the triggered buffer status report.

The first embodiment of the invention may be implemented in the following exemplary way. The triggering of a scheduling request in the user equipment depends on two conditions, which shall be both fulfilled. Both trigger conditions in the context of an LTE implementation relate to the transmission of a buffer status report, which however directly leads to a transmission of a scheduling request, since it is assumed that no resources are available for the user equipment to transmit the triggered buffer status report; thus, it can be also said that the trigger conditions are defined for the transmission of the scheduling request too.

The first trigger condition requires new data to become available in the transmission buffer, which means that data from higher layers shall be transmitted in the uplink to the base station and is thus entered into the transmission buffer of the user equipment. It should be noted that the first trigger condition is fulfilled independent from whether the transmission buffer is empty or not and independent from the priority of the new data, as long as new data becomes available in the transmission buffer. A variant of this first trigger condition will be explained later, which advantageously reuses the trigger condition for the buffer status report as currently used in the 3GPP standardization and as explained in this Background Section.

This is depicted in FIGS. 11 and 13, where the user equipment checks whether new data arrives in its transmission buffer.

The second trigger condition is basically responsible for postponing the triggering of the scheduling request; it requires that there is enough data in the transmission buffer or that the data be in the transmission buffer for at least a specific amount of time. Correspondingly, the data in the transmission buffer shall in general surpass a predetermined threshold, be it an amount of data or a period of time. The triggering of the scheduling request becomes thus threshold-based according to this first embodiment.

For the second trigger condition the user equipment checks for example whether the amount of data in the transmission buffer is at least equal to or higher than a predetermined data quantity threshold.

In FIGS. 11 and 13 it is assumed that the user equipment checks the second trigger condition requiring the amount of data to exceed a threshold, i.e., be equal to or higher than the threshold. Though it appears logical to check the first and second trigger condition in the order as illustrated in FIGS. 11 and 13, i.e., first the first trigger condition and then the second trigger condition, this is not necessary. The user equipment may also first check the second trigger condition and then the first trigger condition.

It should be also noted that if the second trigger condition (requiring the data amount to surpass a data quality threshold) is fulfilled, this automatically requires that the first trigger condition is fulfilled. In other words, the amount of data in the transmission buffer can only then suddenly exceed a predetermined data amount, if new data arrives in the transmission buffer, which corresponds to the requirement of the first trigger condition. Thus, in one alternative of the first embodiment, the first trigger condition does not necessarily need to be checked for the first embodiment; it suffices to check only the second trigger condition such that the BSR/SR is triggered when the amount of data in the transmission buffer exceeds a certain threshold.

Alternatively, instead of the data quantity threshold as the second trigger condition, the user equipment starts a timer with a predetermined time length when data arrives in the empty transmission buffer. This alternative is depicted in FIG. 12. The timer is not started every time new data becomes available at the transmission buffer, but only for the first time when the data enters an empty transmission buffer. Then, when the thus started timer related to the data of the transmission buffer expires, the user equipment considers the second trigger condition to be true.

In contrast to the other variant of the second trigger condition (see FIGS. 11 and 13), in case a timer is used as the second trigger condition, the first trigger condition does not necessarily need to be fulfilled when the second trigger condition is fulfilled. Correspondingly, the fact that the first trigger condition is true may be stored in the user equipment as long as necessary, i.e., as long as it checks for the second trigger condition. On the other hand, if the timer for the second trigger condition is started when the user equipment determines for the first time that the first trigger condition is fulfilled, the storing of the fulfilled first trigger condition is implicit in the running of the timer; a separate storage in said respect is then not necessary.

According to still further variants of the first embodiment, the first trigger condition may correspond to the one that is currently employed in the 3GPP standard and explained in the background section. In particular, the first trigger condition might thus require that new data arrives in an empty transmission buffer, or that the new data arriving in a non-empty transmission buffer has a higher priority than the data already stored in the non-empty transmission buffer (compare to TS 36.321 v10.5.0 5.4.5). It should be noted that the first trigger condition according to standard definition would not be fulfilled for data arriving in a non-empty transmission buffer, since said newly arrived data might not have a higher priority but most likely the same priority as that data already in the transmission buffer. Accordingly, the first trigger condition would only become true when new data arrives in the empty transmission buffer; this first trigger condition becoming true shall be stored for as long as necessary, e.g., while determining whether the second trigger condition is fulfilled. Alternatively, when the second trigger condition is the timer (see above) and the timer is started when the first trigger condition is fulfilled, a separate storing of the fulfilled first trigger condition might not be necessary. Also, when the second trigger condition refers to the data quantity threshold, the check for the first trigger condition might be skipped, for basically the same reasons as explained before Correspondingly, when the trigger conditions for transmitting a scheduling request are fulfilled as explained above according to one of the variants of the first embodiment, the scheduling request is transmitted from the user equipment to the base station. FIG. 13 is more specific in that it illustrates that the above described trigger conditions are checked in order to determine whether to transmit a buffer status report, and that a scheduling request is transmitted when the user equipment additionally determines that resources are not available for transmission of the buffer status report.

Figure 10:
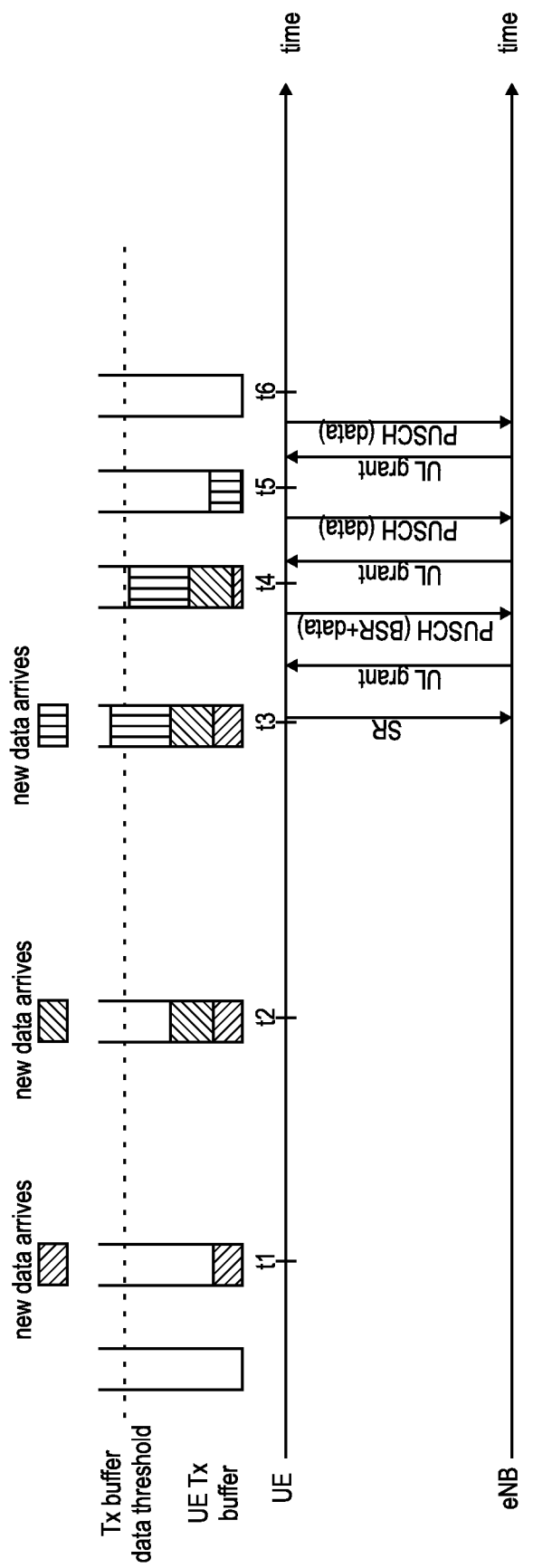
FIG. 10 illustrates the improved resource request procedure between the user equipment and the base station according to the first embodiment of the invention.
Figure 11:
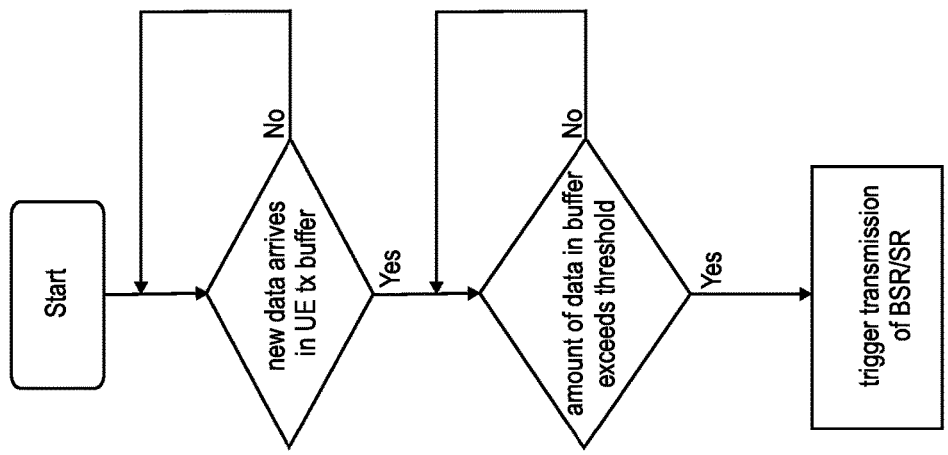

FIG. 10 illustrates that the SR is not transmitted when new data arrives in the empty transmission buffer at time t1 or new data arrives in the transmission buffer at time t2. At time t1 and t2 the first trigger condition according to FIG. 11 or FIG. 13 is fulfilled, but the second trigger condition is not fulfilled yet, since the total amount of data in the transmission buffer remains below the threshold (dashed line in FIG. 10). Only at time t3, the first and the second trigger conditions are fulfilled, which thus triggers in the user equipment a transmission of the scheduling request to the base station. The scheduling request is triggered once, i.e., being a one-shot trigger.

The scheduling request may be transmitted using one of the periodic PUCCH resources, or using a RACH procedure as already indicated before. The scheduling request is usually one bit indicating to the base station that resources for an uplink transmission are needed. The base station receives and processes the scheduling request, and depending on the current radio conditions, allocates more or less uplink resources to the user equipment.

The base station correspondingly transmits an uplink grant to the user equipment using the PDCCH, indicating the allocated uplink resources to the user equipment.

The user equipment monitoring the PDCCH, receives the PDCCH with the uplink grant, and can thus prepare the buffer status report for transmission to the eNodeB. Depending on how much resources were allocated to the user equipment, not only the buffer status report may be sent but also part of the data in the transmission buffer; in that case, the buffer status report only indicates the remaining amount of data in the transmission buffer, i.e., without the data that fits in the first-allocated resources.

The buffer status report and possibly part of the uplink data are transmitted by the user equipment to the eNodeB on the PUSCH. In turn, the eNodeB can allocate further resources to the user equipment, thus allowing the user equipment to empty the transmission buffer as illustrated at times t4, t5 and t6. FIG. 10 assumes a dynamic allocation of uplink resources by the eNodeB (for each subframe a separate uplink grant); however, although not illustrated, a semi-persistent allocation of uplink resources would also be possible, such that the user equipment receives an uplink grant allocating periodic resources in the uplink which may be used by the user equipment to empty the transmission buffer and transmit the data to the eNodeB.

FIG. 10 assumes that three uplink transmissions are sufficient to empty the transmission buffer; however, this is only an example and more or less transmissions may be needed.

The advantages provided by the first embodiment will be explained in the following. From transmission power perspective it is better to transmit larger Transport Block Sizes in a short time, rather than transmitting smaller Transport Block sizes more often. Correspondingly, the data quantity threshold used as the second trigger condition can be defined such that the data of the transmission buffer fits a large transport block size.

The user equipment transmits the scheduling request less often, and as a result, the UE also needs to monitor less often the PDCCH for uplink grants, such that the DRX period of the user equipment may be longer and less power is needed. It should be noted that the transmission power is not only decreased due to less PUCCH transmissions (D-SR) and PUSCH transmissions, but also due to the fact that the "Active Time" is shortened. When comparing the scheduling request procedure of FIG. 9 (prior art) with that of FIG. 10 (invention), the PDCCH load is decreased significantly, in this example by a factor of 3.

The above-explained buffer status report/scheduling request triggering may be implemented in the LTE system as explained in the background section. The first and second trigger conditions shall replace or extend the buffer status request triggering of the prior art. For example, the 3GPP standard trigger (more in particular the first trigger condition which requires that new data arrives in an empty transmission buffer, or that the new data arriving in a non-empty transmission buffer has a higher priority than the data already stored in the non-empty transmission buffer) may be disabled and replaced by the new triggers of this first embodiment.

The trigger definition for triggering the transmission of a buffer status report to be employed in the 3GPP standard of LTE could be according to one variant of the first embodiment:

When new data arrives in the buffer for a logical channel, and the amount of data for this logical channel is above a predefined threshold Up to now, the transmission buffer and buffer status report/scheduling request triggering has been explained for the user equipment in general. Nevertheless, the above described first embodiment may be applicable to only one or more of the various configured logical channels; for the remaining logical channels, the old trigger according to 3GPP standard would be used in this case. The logical channel for which the above-described improved scheduling request triggering of the first embodiment is applied may refer to services having no demanding QoS requirements (e.g., in terms of delay) like voice as for example low volume background services or Instant messaging traffic or specific MTC services for gas metering or animal, cargo, prisoner, elderly and children tracking. For such services the invention described in the various embodiments provides mechanisms allowing an efficient use of radio resources, UE power resources and network resources.

Logical channels in a user equipment are grouped in logical channel groups by the eNodeB, depending, e.g., on the QoS requirements of each logical channel. Correspondingly, the above-described first embodiment may be applicable to one or more of the defined logical channel groups (four in total, at the moment); for the remaining logical channel groups, the old trigger according to 3GPP standard would be used in this case. In particular, when considering whole logical channel groups, the first trigger condition and second trigger condition of the first embodiment shall also apply to a whole logical channel group to determine whether to transmit a buffer status report, i.e., a scheduling request, to the eNodeB. Particularly, the first trigger condition is fulfilled when new data arrives in a transmission buffer of any of the logical channels of a logical channel group. The second trigger condition is fulfilled when the data in the transmission buffers of all the logical channels of a logical channel group (i.e., a sum of all transmission buffer data in a LCG) exceeds a threshold (be it a timer or data quantity threshold).

The particular thresholds used for the second trigger condition may be set by the network or the user equipment; being predefined by the network, gives the network full control over the scheduling related signaling procedures. Advantageously, the user equipment, having more information regarding the traffic statistics running in the uplink, may assist the network in defining a suitable threshold by transmitting appropriate data to the network. Alternatively, the user equipment uses the traffic statistics to select a threshold on its own, and thus may also consider its power management requirements; then, the user equipment may or may not inform the network about the selected threshold Further Embodiments In the following, second, third and fourth embodiments are described, which can be used in addition to each other embodiment, or may be used independent from each other embodiment.

According to a second embodiment of the invention, the active time of the user equipment for monitoring the PDCCH is shortened in order to reduce its battery consumption. Please note that the second embodiment mainly relates to the scheduling request transmitted via the periodic resources of the PUCCH, but not to the scheduling request being transmitted via the RACH procedure. In particular, after transmitting a dedicated scheduling request to the eNodeB, the user equipment needs to monitor the PDCCH for the uplink grant, which the eNodeB sends in response to the scheduling request.

The user equipment behavior currently specified in the 3GPP standard is that the user equipment starts monitoring the PDCCH immediately after sending the dedicated scheduling request; the user equipment is thus in active time beginning from the subframe where the scheduling request is transmitted until the corresponding uplink grant is received. Depending on the eNodeB response, the active time could include potential retransmissions of the scheduling request due to previous transmission errors, and thus become quite long. This is not power efficient.

Figure 14:
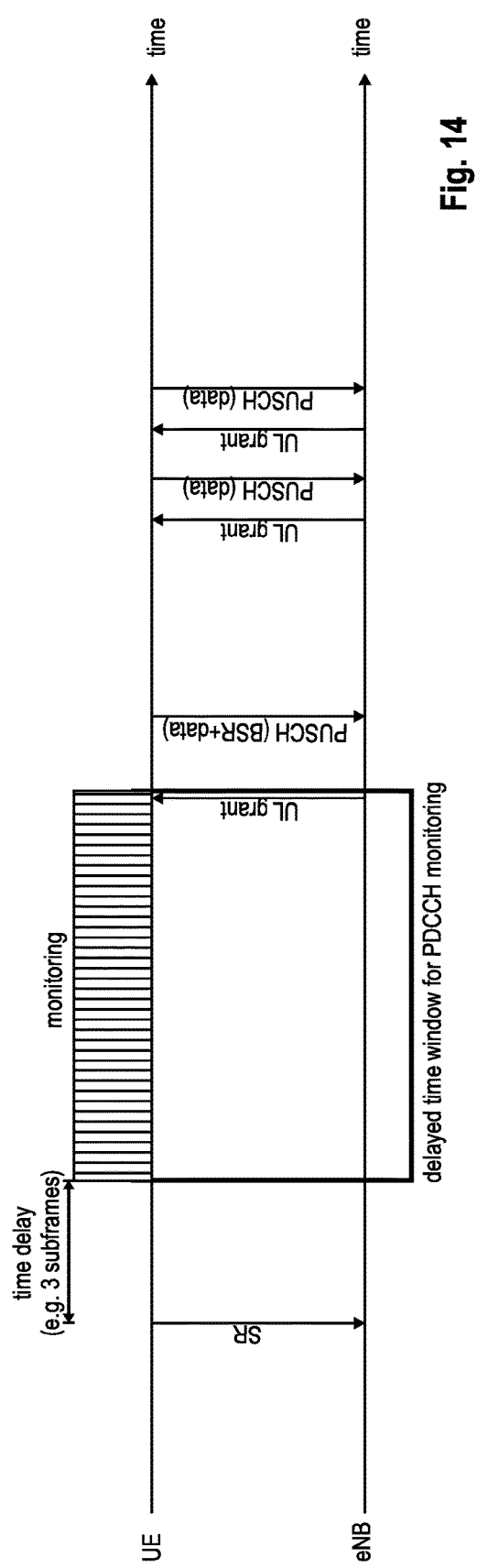
FIG. 14 illustrates the shortened time window for PDCCH monitoring by the UE according to a second embodiment of the invention.

In view of the time needed for the scheduling request and then later the uplink grant to travel over the radio link, and the time needed for the eNodeB to process the scheduling request and to generate and transmit the uplink grant message, in the second embodiment of the invention, the time window for monitoring the PDCCH is shortened, as explained in connection with FIG. 14. A time delay is introduced after sending the scheduling request, such that the user equipment starts monitoring the PDCCH for the uplink grant only after the time delay, i.e., after a predetermined amount of time has expired. The transmission of the scheduling request could start a timer, upon which expiry the user equipment starts the PDCCH monitoring. As an example, 3 subframes could be used as the delay after the dedicated scheduling request transmission.

Furthermore, the PDCCH monitoring may be also stopped after a particular period of time, even if no uplink grant is received; thus, another timer may be running while monitoring the PDCCH, and when the timer expires, the PDCCH monitoring is stopped by the UE. The timer can be started when transmitting the D-SR or when the PDCCH monitoring is started.

Thus, by postponing the start of the PDCCH monitoring in the user equipment, and possibly canceling the PDCCH monitoring ahead of receiving the uplink grant, the user equipment is less in Active Time and thus can save power.

The third embodiment of the invention aims at reducing the active time of a user equipment with respect to uplink data retransmissions. The uplink retransmission protocol, HARQ, used currently in the prior art as standardized by 3GPP, is defined such that there are two kind of retransmissions: non-adaptive and adaptive retransmissions. In general, HARQ schemes can be categorized as either synchronous or asynchronous, with the retransmissions being in each case either adaptive or non-adaptive. In an adaptive HARQ scheme transmission attributes such as the modulation and coding scheme, and transmission resource allocation in the frequency domain, can be changed at each retransmission in response to variation in the radio channel conditions. In a non-adaptive HARQ scheme the retransmissions are performed without explicit signaling of new transmission attributes—either by using the same transmission attributes as those of the previous transmission, or by changing the attributes according to a predefined rule.

A Physical HARQ Indicator CHannel (PHICH) carrying ACK/NACK message for an uplink data transmission may be transmitted at the same time as a PDCCH for the same user equipment. In case of simultaneous transmission of PHICH and PDCCH, the user equipment follows the indication of the PDCCH; in other words, the indication of the PDCCH overwrites the indication of the PHICH of the same subframe. Correspondingly, the user equipment performs either a transmission of new data or a retransmission (being adaptive), regardless of the PHICH content. When no PDCCH for the user equipment is detected, the PHICH content dictates the HARQ behavior of the user equipment.

The currently-used definition of ACK/NACK of the PHICH in the prior art is as follows:

NACK: the terminal performs a non-adaptive retransmission

ACK: the terminal does not perform any uplink retransmission, but keeps the data in the HARQ buffer for the corresponding HARQ process. A further transmission for that HARQ process needs to be explicitly scheduled by a subsequent grant by the PDCCH; until reception of such grant, the terminal is in a "Suspension State".

The following table gives an overview:

| HARQ feedback seen by the UE (PHICH) | PDCCH seen by the UE | UE behavior |
|---|---|---|
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |

The currently specified user equipment behavior with regard to PHICH and PDCCH thus leads to the situation and problem that, when the user equipment receives an ACK, it means that the user equipment should keep the data packet (Transport Block) in the transmission buffer of the HARQ process and monitor at the new HARQ retransmission occasions for a PDCCH. The user equipment has thus to monitor the PDCCH for further potential retransmissions until the maximum number of HARQ transmissions is exceeded. This requires a lot of power in the user equipment.

According to this third embodiment, the retransmission protocol is improved by redefining the user equipment behavior regarding the ACK via PHICH. In particular, when the user equipment receives an ACK via PHICH without receiving any PDCCH at the same time (i.e., in the same subframe), it stops monitoring the PDCCH for further HARQ retransmissions. Also, the HARQ buffer is emptied after receiving the ACK.

In a variation of this third embodiment, the user equipment behavior is only changed for specific configured logical channels (or logical channel groups), i.e., only in case a transport block contains data of such a configured logical channel (group).

This reduces the active time further and hence reduces battery drain at the user equipment.

A fourth embodiment of the invention introduces a scheme for restricting the use of dedicated scheduling request resources to allow power-efficient SR reporting. As explained before various times, dedicated resources on the PUCCH are available to the user equipment to transmit a scheduling request; the dedicated scheduling request resources being periodically allocated by the eNodeB. For example, these dedicated resources of the PUCCH can be assigned a required threshold, which the scheduling request has to "fulfill" in order that the user equipment can transmit the scheduling request using that dedicated resource; otherwise, a later one of the dedicated resources needs to be used (provided the required priority allows it).

In more detail, each dedicated scheduling request resource is assigned a required priority, and each scheduling request to be transmitted by the user equipment is associated with a scheduling request priority. The required priority assigned to a particular dedicated resource can be determined by the network or by the user equipment, and is preferably in the form of a priority threshold. The scheduling request priority can be then defined by the priority of the logical channel which data triggered the scheduling request. The priority of a logical channel can be between 1 and 8, currently.

Correspondingly, when the transmission of a scheduling request is triggered in the user equipment, the user equipment will compare the scheduling request priority against the priority of the currently available dedicated resource of the PUCCH, so as to determine whether it may use said resource to transmit the triggered scheduling request. Only in case the scheduling request priority is equal to or higher than the required priority of the resource, the user equipment transmits the scheduling request using said resource. Otherwise, the user equipment needs to wait for the next dedicated scheduling request resource and again perform the comparison of scheduling request priority against the dedicated resource priority, until the user equipment is able to transmit the scheduling request in a dedicated resource with a low enough required priority.

According to one variant of the fourth embodiment, two D-SR cycles are defined for the user equipment, e.g., a low-priority and a high-priority D-SR cycle. It should be noted however that also more than two cycles can be defined, if necessary; in this case, more than one threshold may be necessary to control access to the different resources.

Figure 15:
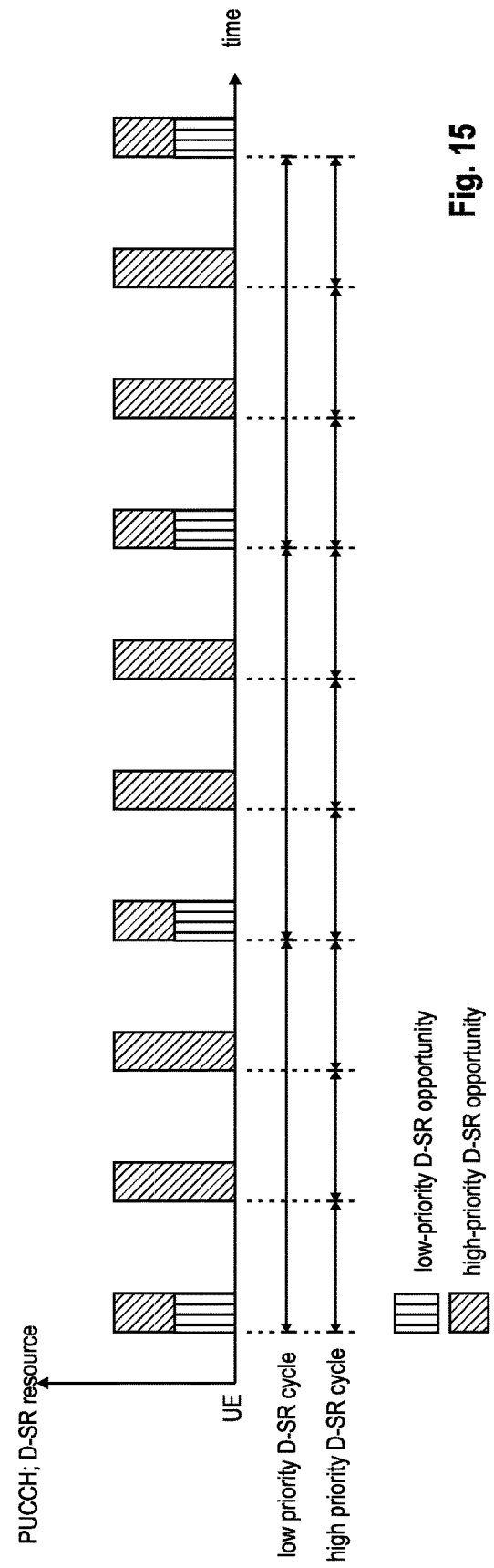
FIG. 15 illustrates the prioritization of dedicated scheduling request resources for transmitting scheduling requests according to a fourth embodiment of the invention.

The low-priority D-SR cycle may or may not be a multiple of the high-priority D-SR cycle. Every n-th periodic PUCCH resource may be associated with the low-priority D-SR cycle, and every m-th periodic PUCCH resource may be associated with the high-priority D-SR cycle. m and n should be different. Preferably, m should be lower than n, such that more resources are available to transmit high-priority scheduling requests than low-priority scheduling requests. In particular, only every, e.g., fourth (low-priority D-SR cycle with n=4) periodic resource shall be usable for low-priority scheduling requests, while, e.g., every resource (high-priority D-SR cycle with m=1) shall be usable for high-priority scheduling requests. This is depicted in FIG. 15.

As a result, low priority scheduling requests are transmitted less often compared to high-priority scheduling requests. The data which triggered a low-priority scheduling request can tolerate more delay, and therefore will be transmitted less frequently, thereby achieving some benefit in terms of battery power. High-priority scheduling requests can be transmitted at every D-SR PUCCH resource in order to fulfill tight delay requirements.

Alternatively, each logical channel (or logical channel group) can be assigned a particular D-SR cycle, the user equipment shall use for scheduling request triggered by data of said logical channels (or logical channel group). This association could be done at radio bearer establishment, when the logical channels are grouped into logical channel groups.

According to further variants of the fourth embodiment, the user equipment shall only use one D-SR cycle at a time. In the example of FIG. 15 this would mean that the user equipment either uses the low-priority or high-priority D-SR cycle at one time. If a low-priority scheduling request is to be transmitted, the low-priority D-SR cycle is used. In case a high-priority scheduling request is triggered, the user equipment (when in low-priority D-SR cycle) will switch to the high-priority D-SR cycle. At the transition between the D-SR cycles (in both ways), the SR_counter should be set to 0, and the sr-ProhibitTimer shall be stopped.

Another variant of the fourth embodiment will be explained with reference to FIG. 16, illustrating the dedicated scheduling request resources for a PCell and an SCell. In this variant, it is assumed that scheduling requests can be transmitted on the PUCCH via the PCell or the SCell. The user equipment uses carrier aggregation to aggregate several serving cells (component carriers), and the user equipment is allocated PUCCH resources for the dedicated scheduling request on multiple cells. In the following and for explanatory purposes only, it is assumed that the user equipment aggregates a PCell and one SCell; a user equipment may have more than one SCell.

The fourth embodiment allows defining usage rules for the D-SR resources of the PCell and SCell. In a first variant, the usage of D-SR resources of the PCell and SCell is distinguished by the priority of the scheduling request. Correspondingly, the D-SR resources of the PCell are assigned a first required priority (e.g., for high-priority), and the D-SR resources of the SCell are assigned a second required priority (e.g., for low-priority). Thus, the user equipment shall transmit low-priority scheduling requests preferably via the D-SR resources of the SCell, and shall transmit high-priority scheduling requests preferably via the D-SR resources of the PCell (or if necessary via the D-SR of the SCell).

According to another variant of the fourth embodiment, instead of using priorities, the usage of the SCell/PCell D-SR resources might depend on the kind of data that triggered the scheduling request, e.g., user vs control data. In particular, the scheduling request triggered by control plane data, such as RRC signaling, shall be transmitted via the D-SR resources of the PCell, whereas a scheduling request triggered by user plane data shall be transmitted via the D-SR resources of the SCell. One advantage is that depending on which D-SR resource was used by the user equipment, the eNodeB has already some knowledge about the kind of traffic it should allocate some uplink resources for, and can hence take this into account when issuing the uplink grant; e.g., in case of using the D-SR of an SCell, the uplink grant will be larger than when using the D-SR of a PCell.

According to another variant of the fourth embodiment, general rules are defined for the usage of the PUCCH resources (D-SR) for scheduling request on PCell and potential PUCCH resources on SCell(s). For example UE always starts using PUCCH resources on SCell (if configured) when requesting resources for uplink transmissions. Only in case SR transmission fails on SCell, UE will start using PUCCH resources on PCell. For the case that UE aggregates multiple SCells with configured PUCCH resources, the UE may select autonomously which of them to use for requesting uplink (PUSCH) resource, or a prioritization of the SCell PUCCH resources (D-SR) could be applied as outlined in one of the described variations, e.g., according to traffic type, cell type.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein. Furthermore, the eNodeB comprises means that enable the eNodeB to evaluate the IPMI set quality of respective user equipments from the IPMI set quality information received from the user equipments and to consider the IPMI set quality of the different user equipments in the scheduling of the different user equipments by its scheduler.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A base station comprising:
a transmitter to transmit, to a user equipment, configuration information to configure a second trigger condition for a logical channel of the user equipment, wherein the logical channel is for services that have a tolerance for delay; and
a receiver to receive a scheduling request from the user equipment requesting uplink resources,
wherein transmission of the scheduling request from the user equipment to the base station is triggered by the user equipment:
determining that a first trigger condition is fulfilled for the logical channel when data becomes available in a transmission buffer of the user equipment;
starting a timer when the first trigger condition is fulfilled to postpone transmission of the scheduling request; and
determining that the second trigger condition is fulfilled when the timer expires.

2. The base station according to claim 1, wherein the transmission buffer of the user equipment is used to buffer data to be transmitted in an uplink to the base station.

3. The base station according to claim 1, wherein the first trigger condition and the second trigger condition are, in operation, stored in the user equipment.

4. The station according to claim 1, wherein the user equipment determining the first trigger condition is fulfilled comprises: determining that new data arrives in the transmission buffer when the transmission buffer is empty; or determining that new data arrives in the transmission buffer with a higher priority than data already stored in the transmission buffer.

5. A method executed by a base station, comprising:
transmitting, to a user equipment, configuration information to configure a second trigger condition for a logical channel of the user equipment, wherein the logical channel is for services that have a tolerance for delay; and
receiving a scheduling request transmitted from the user equipment requesting uplink resources,
wherein transmission of the scheduling request from the user equipment to the base station is triggered by the user equipment:
determining that a first trigger condition is fulfilled for the logical channel when data becomes available in a transmission buffer of the user equipment;
starting a timer when the first trigger condition is fulfilled to postpone transmission of the scheduling request; and
determining that the second trigger condition is fulfilled for the logical channel when the timer expires.

6. The method according to claim 5, wherein the transmission buffer of the user equipment is used to buffer data to be transmitted in an uplink to the base station.

7. The method according to claim 5, wherein the first trigger condition and the second trigger condition are stored in the user equipment.

8. The method according to claim 5, wherein the user equipment determining the first trigger condition is fulfilled comprises: determining new data arrives in the transmission buffer when the transmission buffer is empty, or determining that new data arrives in the transmission buffer with a higher priority than data already stored in the transmission buffer.

9. A method executed by a user equipment, the method comprising:
receiving, from a base station, configuration information to configure a trigger condition for a logical channel of the user equipment, wherein the logical channel is for services that have a tolerance for delay;
determining a buffer status report is triggered when data for the logical channel becomes available in a transmission buffer of the user equipment;
starting a timer when the buffer status report is triggered to postpone transmission of a scheduling request;
determining the trigger condition is fulfilled when the timer expires; and
transmitting the scheduling request based on determining that the trigger condition is fulfilled.

10. The method according to claim 9, further comprising:
buffering data to be transmitted in an uplink to the base station in the transmission buffer.

11. The method according to claim 9, further comprising:
identifying uplink resources allocated to the user equipment based on the scheduling request; and
transmitting the buffer status report to the base station in the uplink resources.

12. The method according to claim 9, wherein determining the buffer status report is triggered further comprises:
receiving data for the transmission buffer when the transmission buffer is empty; and
determining the buffer status report is triggered based on receiving the data for the transmission buffer when the transmission buffer is empty.

13. The method according to claim 9, wherein the data is first data and determining the buffer status report is triggered further comprises:

receiving the first data for the transmission buffer;

determining the first data has a higher priority than second data stored in the transmission buffer at a time of receiving the first data for the transmission buffer; and determining that the buffer status report is triggered based on receiving the first data with the higher priority.

14. A user equipment comprising:

a transmission buffer to buffer uplink data to be transmitted to a network;

processing circuitry coupled with the transmission buffer, the processing circuitry to:

receive, from the network, configuration information to configure a trigger condition for a logical channel of the user equipment, wherein the logical channel is for services that have a tolerance for delay;

determining a buffer status report is triggered when data for the logical channel becomes available in the transmission buffer of the user equipment;

starting a timer when the buffer status report is triggered to postpone transmission of a scheduling request;

determining the trigger condition is fulfilled when the timer expires; and transmitting the scheduling request based on determining that the trigger condition is fulfilled.

15. The user equipment according to claim 14, further comprising:

identifying uplink resources allocated to the user equipment based on the scheduling request; and transmitting the buffer status report to the network in the uplink resources.

16. The user equipment according to claim 14, wherein determining the buffer status report is triggered further comprises:

receiving data for the transmission buffer when the transmission buffer is empty; and determining the buffer status report is triggered based on receiving the data for the transmission buffer when the transmission buffer is empty.

17. The user equipment according to claim 14, wherein the data is first data and determining the buffer status report is triggered further comprises:

receiving the first data for the transmission buffer;

determining the first data has a higher priority than second data stored in the transmission buffer at a time of receiving the first data for the transmission buffer; and determining the buffer status report is triggered based on receiving the first data with the higher priority.

18. An apparatus comprising:

memory to store configuration information; and processing circuitry coupled with the memory, the processing circuitry to:

generate a message to be transmitted to a user equipment, the message having the configuration information to configure a trigger condition for a logical channel of the user equipment, wherein the logical channel is for services that have a tolerance for delay; and process a scheduling request from the user equipment, the scheduling request to request uplink resources, wherein transmission of the scheduling request from the user equipment is triggered by the user equipment:

determining a buffer status report is triggered when data for the logical channel becomes available in a transmission buffer;

starting a timer when the buffer status report is triggered to postpone transmission of the scheduling request;

determining the trigger condition is fulfilled when the timer expires; and transmitting the scheduling request based on determining that the trigger condition is fulfilled.

19. The apparatus according to claim 18, wherein the processing circuitry is further to:

allocate uplink resources based on the scheduling request; and receive the buffer status report in the allocated uplink resources.

20. The apparatus according to claim 19, wherein the processing circuitry is further to: receive the data for the logical channel in the allocated uplink resources.

\* \* \* \* \*